United States Patent
Liu et al.

(10) Patent No.: US 11,190,626 B2
(45) Date of Patent: Nov. 30, 2021

(54) DATA TRANSMISSION METHOD, COMMUNICATIONS DEVICE, TERMINAL, AND BASE STATION

(71) Applicant: HUAWEI TECHNOLOGIES CO., LTD., Guangdong (CN)

(72) Inventors: Jing Liu, Shanghai (CN); Lifeng Han, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 48 days.

(21) Appl. No.: 16/535,772

(22) Filed: Aug. 8, 2019

(65) Prior Publication Data

US 2019/0364137 A1 Nov. 28, 2019

Related U.S. Application Data

(63) Continuation of application No. PCT/CN2017/117540, filed on Dec. 20, 2017.

(30) Foreign Application Priority Data

Feb. 10, 2017 (CN) .................. 201710074932.4

(51) Int. Cl.
*H04L 29/06* (2006.01)
*H04L 1/18* (2006.01)
(Continued)

(52) U.S. Cl.
CPC ............ *H04L 69/22* (2013.01); *H04L 1/1812* (2013.01); *H04W 28/06* (2013.01); *H04W 72/1242* (2013.01)

(58) Field of Classification Search
CPC combination set(s) only.
See application file for complete search history.

(56) References Cited

U.S. PATENT DOCUMENTS

2007/0097205 A1* 5/2007 Venkatachalam .... H04N 19/172
 348/14.02
2008/0123660 A1* 5/2008 Sammour ......... H04W 72/1236
 370/395.21
(Continued)

FOREIGN PATENT DOCUMENTS

CN 1780255 A 5/2006
CN 102013962 A 4/2011
(Continued)

OTHER PUBLICATIONS

ITU-T H.264, (Oct. 2016), Series H: Audiovisual and Multimedia SystemsInfrastructure of audiovisual services—Coding of moving video, Advanced video coding for generic audiovisual services, Oct. 2016. total 804 pages.
(Continued)

*Primary Examiner* — Xavier S Wong
(74) *Attorney, Agent, or Firm* — Womble Bond Dickinson (US) LLP

(57) ABSTRACT

Embodiments of the present application relate to the field of data transmission, and provide a data transmission method, a communications device, a terminal, and a base station. In at least one embodiment, different configuration parameters are configured for data packets having different importance, so that an important data packet is ensured at a high priority. In at least one embodiment, a communications device is configured to determine an attribute of a data packet to be transmitted, where the attribute of the data packet is used to indicate importance of the data packet. The communications device is configured to transmit the data packet by using a configuration parameter corresponding to the attribute of the data packet.

17 Claims, 16 Drawing Sheets

(51) Int. Cl.
*H04W 28/06* (2009.01)
*H04W 72/12* (2009.01)

(56) References Cited

U.S. PATENT DOCUMENTS

| | | | |
|---|---|---|---|
| 2011/0055886 A1* | 3/2011 | Bennett | H04N 21/23476 |
| | | | 725/116 |
| 2012/0057560 A1 | 3/2012 | Park et al. | |
| 2012/0069927 A1* | 3/2012 | Oyman | H04L 1/0027 |
| | | | 375/285 |
| 2015/0003242 A1 | 1/2015 | Han et al. | |
| 2015/0009930 A1 | 1/2015 | Rapaport et al. | |
| 2015/0106480 A1* | 4/2015 | Jadhav | H04L 43/062 |
| | | | 709/219 |
| 2015/0264359 A1* | 9/2015 | Vanam | H04N 19/46 |
| | | | 375/240.27 |

FOREIGN PATENT DOCUMENTS

| | | |
|---|---|---|
| CN | 103814582 A | 5/2014 |
| CN | 103874140 A | 6/2014 |
| JP | 2002199453 A | 7/2002 |
| JP | 2010536234 A | 11/2010 |
| JP | 2015508260 A | 3/2015 |
| RU | 2354061 C2 | 4/2009 |
| WO | 2011026414 A1 | 3/2011 |
| WO | 2016002436 A1 | 1/2016 |

OTHER PUBLICATIONS

Intel Corporation, Video signalling related enhancements 3GPP TSG-RAN WG2 Meeting #95, Gothenburg, Sweden, Aug. 22, 26, 2016, R2-164992, 5 pages.

\* cited by examiner

DATA TRANSMISSION METHOD, COMMUNICATIONS DEVICE, TERMINAL, AND BASE STATION

CROSS-REFERENCE TO RELATED APPLICATIONS

This application is a continuation of International Application No. PCT/CN2017/117540, filed on Dec. 20, 2017, which claims priority to Chinese Patent Application No. 201710074932.4, filed on Feb. 10, 2017. The disclosures of the aforementioned applications are hereby incorporated by reference in their entireties.

TECHNICAL FIELD

Embodiments of the present application relate to the communications field, and in particular, to a data transmission method, a communications device, a terminal, and a base station.

BACKGROUND

In a video coding standard, decodable data frames may be classified into an intra frame (I-frame), a unidirectional predicted frame (P-frame), and a bi-directional predicted frame (B-frame).

An I-frame is a complete picture, and a P-frame and a B-frame record changes of the P-frame and the B-frame relative to the I-frame. The I-frame has a function of terminating propagation of an error. The P-frame is often used as a reference frame of other inter frames, and has an effect inferior to that of the I-frame. Usually, the B-frame is not used as a reference frame, and therefore, loss of the B-frame has relatively small impact on video decoding quality. If the I-frame has an error in a transmission process, the P-frame and the B-frame cannot be decoded. Therefore, it is of great importance to distinguish between different frame types of data streams during video transmission application.

However, in a current transmission scheduling policy, all video frames (for example, the I-frame, the P-frame, and the B-frame) use a same configuration parameter in transmission. In this way, when a network is congested, once the I-frame serving as a decoding basis is lost, the P-frame and the B-frame cannot be decoded, invalid transmission is caused, and video quality is severely affected.

SUMMARY

Embodiments of the present application provide a data transmission method, a communications device, a terminal, and a base station, to improve transmission reliability of a data packet having relatively high importance, thereby reducing impact caused by a case such as a congested network on transmission quality of a to-be-transmitted service.

The following technical solutions are used in the embodiments of the present application to achieve the foregoing objectives.

In at least one embodiment of the present application provides a data transmission method, including: determining, by a communications device, an attribute of a data packet to be transmitted, where the attribute of the data packet is used to indicate importance of the data packet; and transmitting, by the communications device, the data packet by using a configuration parameter corresponding to the attribute of the data packet.

According to the data transmission method provided in the embodiment of the present application, the attribute of the data packet to be transmitted is determined, and then the data packet is transmitted by using the configuration parameter corresponding to the attribute of the data packet. In this way, if attributes of data packets are different, different configuration parameters are used during transmission of the data packets. In the prior art, data packets in a same to-be-transmitted service are transmitted by using a same configuration parameter, and in the embodiment of the present application, data packets included in a to-be-transmitted service are transmitted based on attributes by using configuration parameters corresponding to the data packets. Therefore, data packets having different attributes correspond to different configuration parameters, and the data packets having different attributes can be distinguished to improve reliability of a to-be-transmitted data packet having relatively high importance, thereby reducing impact caused by a case such as a congested network on transmission quality of the to-be-transmitted service.

In at least one embodiment, before the transmitting, by the communications device, the data packet by using a configuration parameter corresponding to the attribute of the data packet, the method provided in the embodiment of the present application includes: determining, by the communications device, the configuration parameter of the data packet based on the attribute of the data packet.

In at least one embodiment, the attribute is an important attribute or an unimportant attribute, the configuration parameter is a hybrid automatic repeat request HARQ parameter, and the determining, by the communications device, the configuration parameter of the data packet based on the attribute of the data packet includes: determining, by the communications device, that the configuration parameter of the data packet is a first HARQ parameter or a second HARQ parameter, where the first HARQ parameter is a configuration parameter corresponding to the important attribute, the second HARQ parameter is a configuration parameter corresponding to the unimportant attribute, and a value of the first HARQ parameter is greater than a value of the second HARQ parameter; or the configuration parameter is a discard timing length, and the determining, by the communications device, the configuration parameter of the data packet based on the attribute of the data packet includes: determining, by the communications device, that the configuration parameter of the data packet is a first discard timing length or a second discard timing length, where the first discard timing length is a configuration parameter corresponding to the important attribute, the second discard timing length is a configuration parameter corresponding to the unimportant attribute, and the first discard timing length is greater than the second discard timing length. Different HARQ parameters (for example, the first HARQ parameter and the second HARQ parameter) are configured for data packets having different attributes. In this way, after transmission of the data packets having different attributes fails, a data packet having an important attribute can be transmitted for a plurality of times, to ensure transmission of the data packet having an important attribute as successful as possible. In addition, different discard timing lengths (for example, the first discard timing length and the second discard timing length) are configured for data packets having different attributes. In this way, when the data packets having different attributes reach respective discard timing lengths, because the second discard timing length corresponding to the important attribute is greater than the first discard timing length corresponding to the unimportant attribute, when network resources remain unchanged, a data packet having an unimportant attribute is discarded in time to avoid that the data packet having an unimportant attribute occupies many network resources, thereby ensuring reliable transmission of the data packet having an important attribute.

In at least one embodiment, determining, by a communications device, an attribute of a data packet to be transmitted includes: receiving, by the communications device by using a media access control MAC entity, first indication information that is sent by a packet data convergence protocol PDCP entity of the communications device to the MAC entity and that is used to indicate the attribute of the data packet received by the terminal; and determining, by the communications device, the attribute of the data packet according to the first indication information; or determining, by the communications device, the attribute of the data packet based on a radio link control RLC header of the data packet, where the RLC header carries an identifier that uniquely identifies the attribute of the data packet.

In at least one embodiment, determining, by a communications device, an attribute of a data packet to be transmitted includes: determining, by the communications device, the attribute of the data packet obtained through a first logical channel as the important attribute; and determining, by the communications device, the attribute of the data packet obtained through a second logical channel as the unimportant attribute.

In at least one embodiment, the communications device is a terminal, and before the determining, by a communications device, an attribute of a data packet to be transmitted, the method provided in this embodiment of the present application includes: receiving, by the terminal, second indication information that is sent by a base station and that is used to indicate a correspondence between data packets having different attributes and logical channels used for transmitting the data packets. In this way, when receiving a data packet through the first logical channel, the terminal may determine that an attribute of the data packet is the important attribute, and when receiving a data packet through the second logical channel, the terminal may determine that an attribute of the data packet is the unimportant attribute.

In at least one embodiment, before determining, by the communications device, the configuration parameter of the data packet based on the attribute of the data packet, the method provided in this embodiment of the present application further includes: receiving, by the terminal, first configuration instruction information that is sent by the base station and that is used to instruct the terminal to configure different configuration parameters for the data packets having different attributes.

In at least one embodiment, the communications device is a base station, and the method provided in this embodiment of the present application further includes: sending, by the base station, first configuration instruction information to a terminal, where the first configuration instruction information is used to instruct the terminal to configure different configuration parameters for data packets having different attributes.

In at least one embodiment, a communications device includes: a determining unit, configured to determine an attribute of a data packet to be transmitted, where the attribute of the data packet is used to indicate importance of the data packet; and a transmission unit, configured to transmit the data packet by using a configuration parameter corresponding to the attribute of the data packet.

In at least one embodiment, the determining unit is further configured to: determine the configuration parameter of the data packet based on the attribute of the data packet.

In at least one embodiment, the attribute is an important attribute or an unimportant attribute, the configuration parameter is a hybrid automatic repeat request HARQ parameter, and the determining unit is configured to determine that the configuration parameter of the data packet is a first HARQ parameter or a second HARQ parameter, where the first HARQ parameter is a configuration parameter corresponding to the important attribute, the second HARQ parameter is a configuration parameter corresponding to the unimportant attribute, and a value of the first HARQ parameter is greater than a value of the second HARQ parameter; or the configuration parameter is a discard timing length, and the determining unit is further configured to determine that the configuration parameter of the data packet is a first discard timing length or a second discard timing length, where the first discard timing length is a configuration parameter corresponding to the important attribute, the second discard timing length is a configuration parameter corresponding to the unimportant attribute, and the first discard timing length is greater than the second discard timing length.

In at least one embodiment, the communications device includes: a first receiving unit, configured to receive, by using a MAC entity of the communications device, first indication information that is sent by a PDCP entity of the communications device to the MAC entity and that is used to indicate the attribute of the data packet received by the terminal, where the determining unit is further configured to determine the attribute of the data packet according to the first indication information; or the determining unit is further configured to determine the attribute of the data packet based on an RLC header of the data packet, where the RLC header carries an identifier that uniquely identifies the attribute of the data packet.

In at least one embodiment, the determining unit is configured to determine the attribute of the data packet obtained through a first logical channel as the important attribute; and determine the attribute of the data packet obtained through a second logical channel as the unimportant attribute.

In at least one embodiment, the communications device further includes: a second receiving unit, configured to receive second indication information that is sent by a base station and that is used to indicate a correspondence between data packets having different attributes and logical channels used for transmitting the data packets.

In at least one embodiment, the communications device further includes: the second receiving unit configured to receive first configuration instruction information that is sent by the base station and that is used to instruct the terminal to configure different configuration parameters for the data packets having different attributes.

In at least one embodiment, the communication device further includes: a sending unit, configured to send first configuration instruction information to a terminal, where the first configuration instruction information is used to instruct the terminal to configure different configuration parameters for data packets having different attributes.

In at least one embodiment, a terminal includes a processor, a memory, a system bus, and a communications interface, where the memory is configured to store a computer-executable instruction, the processor and the memory are connected by using the system bus, and when the terminal is run, the processor executes the computer-executable instruction stored in the memory, to enable the terminal to perform the data transmission method according to at least one embodiment described herein.

In at least one embodiment, a base station includes a processor, a memory, a system bus, and a communications interface, where the memory is configured to store a computer-executable instruction, the processor and the memory are connected by using the system bus, and when the base station is run, the processor executes the computer-executable instruction stored in the memory, to enable the base station to perform the data transmission method according to at least one embodiment described herein.

In at least one embodiment, a computer-readable storage medium stores an instruction, and when the computer-readable storage medium is run on a computer, a terminal is enabled to execute the instruction of the data transmission method according to at least one embodiment described herein.

In at least one embodiment, a computer-readable storage medium stores an instruction, and when the computer-readable storage medium is run on a computer, a base station is enabled to perform the instruction of the data transmission method according to at least one embodiment described herein.

In at least one embodiment, a computer program product includes an instruction, and when the computer program product is run on a base station, the base station is enabled to perform the data transmission method according to at least one embodiment described herein.

In at least one embodiment, a computer program product includes an instruction, and when the computer program product is run on a terminal, the terminal is enabled to perform the data transmission method according to at least one embodiment described herein.

In at least one embodiment, a chip system applied to a base station includes at least one processor and an interface circuit, the interface circuit and the at least one processor are connected to each other by using a line, and the processor is configured to execute an instruction to perform the data transmission method according to at least one embodiment described herein.

In at least one embodiment, a chip system applied to a terminal includes at least one processor and an interface circuit, the interface circuit and the at least one processor are connected to each other by using a line, and the processor is configured to execute an instruction to perform the data transmission method according to at least one embodiment described herein.

In at least one embodiment, a communications system includes the terminal according to at least one embodiment described herein, and the base station according to at least one embodiment described herein.

It may be understood that, the terminal, the base station, or the computer storage medium provided above is configured to perform the corresponding data transmission method described above. Therefore, for beneficial effects that can be achieved by the terminal, the base station, or the computer storage medium, refer to the beneficial effects of the corresponding method described above, and details are not described therein again.

DESCRIPTION OF EMBODIMENTS

Figure 1A:
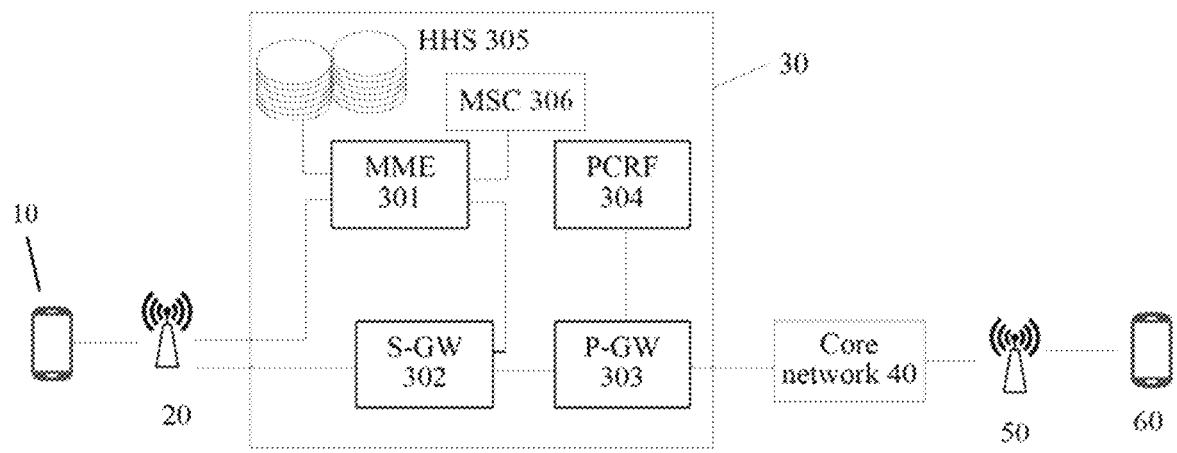
FIG. 1a is an architectural diagram of a communications system according to an embodiment of the present application.

The following describes embodiments of the present application with reference to the accompanying drawings.

For ease of describing the technical solutions in the embodiments of the present application clearly, words such as "first" and "second" are used in the embodiments of the present application to distinguish between same items or similar items that provide basically same functions or purposes. One of ordinary skill in the art may understand that the words such as "first" and "second" do not limit a quantity and an execution order.

A maximum hybrid automatic repeat request (HARQ) parameter in the embodiments of the present application is a maximum quantity of times of uplink retransmission, and is used to limit a maximum quantity of times of retransmission of uplink data of a terminal.

A discard time length in the embodiments of the present application is a length of a discard timer corresponding to a PDCP SDU. Each time a PDCP entity receives a PDCP SDU, the PDCP entity initiates a timer corresponding to the PDCP SDU, and when the timer is timed out, the PDCP entity discards the PDCP SDU and a corresponding PDCP PDU.

A to-be-transmitted service sent by the terminal to a base station may include a plurality of data packets having different attributes (using a video transmission service as an example for description). Usually, the terminal encodes a plurality of consecutive images in the video transmission service into three frame types: an I-frame, a P-frame, and a B-frame.

The I-frame is encoded through intra-frame prediction, and the I-frame can be decompressed into a separate and complete image by using a video decompression algorithm, that is, the I-frame can be independently decoded without referring to other frame data. The I-frame is compressed by removing spatial redundant information of the image as much as possible.

The P-frame, also referred to as a predicted frame, is a coded image whose transmitted data volume is compressed by fully reducing temporal redundancy information about preceding coded frames in an image sequence. The P-frame is predicted by using a preceding P-frame or I-frame. For the P-frame, data of the frame is compressed based on differences between the frame and one or several preceding frames neighboring to the frame. The P-frame is a forward-predicted inter frame. The P-frame refers to only an I-frame or a P-frame which is located before the P-frame and close to the P-frame.

The B-frame may also be referred to as a bi-directional predicted frame, and when an image frame is compressed into the B-frame, the B-frame is compressed based on differences between data of several preceding frames neighboring to the B-frame, the B-frame, and several frames following the B-frame. That is, only a difference between the B-frame and the several preceding and following frames neighboring to the B-frame is recorded.

In conclusion, an ultra high compression ratio can be achieved by using the B-frame during image compression. Generally, the I-frame has lowest compression efficiency, the P-frame has relatively high compression efficiency, and the B-frame has highest compression efficiency. Simply, the I-frame is a complete image, and the P-frame and the B-frame record changes relative to the I-frame, and without the I-frame, the P-frame and the B-frame cannot be decoded. Therefore, when transmitting a video transmission service, the communications device may use the I-frame as a data packet (or referred to as an important data packet) whose attribute is an important attribute and that is in the video transmission service, and use the P-frame and the B-frame as data packets (or referred to as unimportant data packets) whose attribute is an unimportant attribute and that are in the video transmission service.

However, in the prior art, when the terminal performs uplink transmission to the base station, non-adaptive retransmission is used, that is, usually, data packets that have different attributes and that are in a same to-be-transmitted service use a same configuration parameter.

On one hand, the terminal receives, by using a radio resource control (RRC) message, an HARQ parameter, namely, a maximum uplink retransmission parameter, configured by the base station for the terminal. In this way, the terminal transmits a to-be-transmitted service to the base station based on a maximum hybrid automatic repeat request that is configured. When transmission of the to-be-transmitted service fails, the terminal transmits the to-be-transmitted service based on the maximum hybrid automatic repeat request corresponding to the to-be-transmitted service. When the to-be-transmitted service reaches the maximum hybrid automatic repeat request, and transmission of the to-be-transmitted service still fails, the terminal discards the to-be-transmitted service.

On the other hand, the base station configures a discard timing length for a discard timer (DT) corresponding to each to-be-transmitted service of the terminal. In this way, each time the terminal receives a PDCP SDU, the terminal enables the discard timer corresponding to the to-be-transmitted service. When the terminal determines that the discard timer corresponding to the to-be-transmitted service exceeds the discard timing length configured for the discard timer, the terminal discards the PDCP SDU and a corresponding PDCP PDU.

In conclusion, according to the foregoing method, all data packets in a same to-be-transmitted service uploaded by the terminal use a same configuration parameter. Therefore, a plurality of data packets that have different importance and that are in a same to-be-transmitted service also use a same configuration parameter, that is, an important data packet and an unimportant data packet correspond to a same maximum quantity of times of uplink transmission or correspond to a same discard timer. In this case, when a network is congested, because the important data packet and the unimportant data packet are not distinguished, once transmission of the important data packet fails (for example, if transmission of the I-frame fails in a transmission process, the P-frame and the B-frame cannot be decoded), transmission quality of the entire to-be-transmitted service is affected.

In the embodiments of the present application, a plurality of data packets included in the to-be-transmitted service are distinguished based on importance, and different configuration parameters are configured for data packets having different attributes. In this way, when a same to-be-transmitted service includes a plurality of data packets having different attributes, the data packets corresponding to the different attributes are transmitted at different configuration parameters, thereby avoiding failure of transmission of important data packets as much as possible, and reducing impact on transmission quality of the to-be-transmitted service.

It should be understood that, the technical solutions in the embodiments of the present application may be applied to various communications systems, for example: a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD), a universal mobile telecommunications system (UMTS), a worldwide interoperability for microwave access (WiMAX) communications system, and a microwave communications system.

In the embodiments of the present application, a base station (BS for short) may be a device communicating with a terminal or another communications site such as a repeater site, and the base station may provide communication coverage, for a specific physical region. For example, the base station may be a base transceiver station (BTS) or a base station controller (BSC) in GSM or CDMA; a NodeB (NB) in UMTS, or a radio network controller (RNC) in UMTS; an evolved nodeB (eNB or eNodeB) in LTE; or another access network device that is in a wireless communications network and that provides an access service. This is not limited in the embodiments of the present application.

In the embodiments of the present application, terminals may be distributed in an entire wireless network, and each terminal may be static or mobile.

The terminal may be referred to as user equipment (UE), a server, a mobile station (mobile station), a subscriber unit, a station, and the like. The UE may be a cellular phone, a personal digital assistant (PDA), a wireless modem, a wireless communications device, a handheld device, a laptop computer, a cordless phone, a wireless local loop (WLL for short) station, or the like. When UE is applied to an M2M mode for communication, the UE may be referred to as an M2M terminal, which may be an intelligent meter, intelligent house appliance, or the like that supports M2M communication.

As shown in FIG. 1a, FIG. 1a is an architectural diagram of a data transmission system to which a data transmission method is applied according to an embodiment of the present application. As shown in FIG. 1a, the data transmission system includes a first terminal 10, a first base station 20, a core network 30, a core network 40, a second base station 50, and a second terminal 60. The first base station 20 provides a service for the first terminal 10, and the second base station 50 provides a service for the second terminal 60. When the first terminal 10 needs to transmit a to-be-transmitted service to the second terminal 60, where the to-be-transmitted service includes a plurality of data packets, the first terminal 10 transmits each data packet in the to-be-transmitted service to the first base station 20 based on a configuration parameter corresponding to the data packet. Then, the first base station 20 transmits the to-be-transmitted service to the core network 40 in which the second base station 50 is located, by using the core network 30 in which the first base station 20 is located, based on the configuration parameter corresponding to each data packet in the received to-be-transmitted service. Then, the second base station 50 obtains the to-be-transmitted service from the core network 40, and transmits the to-be-transmitted service to the second terminal 60, so that the first terminal 10 transmits the to-be-transmitted service to the second terminal 60. When the first terminal 10 and the second terminal 60 correspond to different base stations, the first terminal 10 and the second terminal 60 may correspond to a same packet data network gateway (PGW), or correspond to different PGWs.

Specifically, in the embodiment of the present application, a specific structure of a core network is described by using the core network 30 as an example. As shown in FIG. 1a, the core network 30 may include a mobility management entity (MME) 301, a serving gateway (S-GW) 302, a PGW 303, a policy and charging rules function (policy and charging rules function, PCRF) 304, a home subscriber server (HSS) 305, and a mobile switching center (MSC) 306. The MME 301 is a core of a system and is mainly responsible for signaling grooming of a non-access stratum, encryption and integrity protection, and termination of user signaling. Mobility management of a user in a network includes signaling control processing such as user access control, authentication, data encryption, service carrier control, paging, and switching control. As an anchor point for switching between local base stations, the S-GW 302 is mainly responsible for transmission, forwarding, and routing of data information between the base station and the PGW 303, buffering a downlink data packet, and implementing user-based charging. The PGW 303 is an anchor point for data bearers and is mainly responsible for forwarding, parsing, lawful interception of a data packet, service-based charging, service quality of service (QoS) control. The PCRF 304 is mainly configured to make a decision based on user-used service information and user-subscribed policy information, determine a policy for user service use and charging, and deliver the policy to a policy execution entity in a gateway. The HSS 305 is configured to store user subscription information, and the stored information includes user identification information, user security control information, user location information, user policy control information, and the like. The MSC 306 is a device configured to provide a call switch service and call control, and the MSC 306 can complete functions such as call connection, cell handover control, wireless channel management.

Figure 1B:
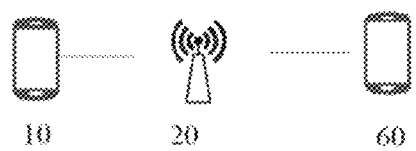
FIG. 1b is an architectural diagram of another communications system according to an embodiment of the present application.

FIG. 1b is another architectural diagram of a data transmission system to which a data transmission method is applied according to an embodiment of the present application. A difference between FIG. 1b and FIG. 1a lies in that, a first terminal and a second terminal belong to a same base station, for example, the base station 20, and when the first terminal 10 and the second terminal 60 are located within coverage of a same base station, the first terminal 10 and the second terminal 60 correspond to a same P-GW.

Figure 2A:
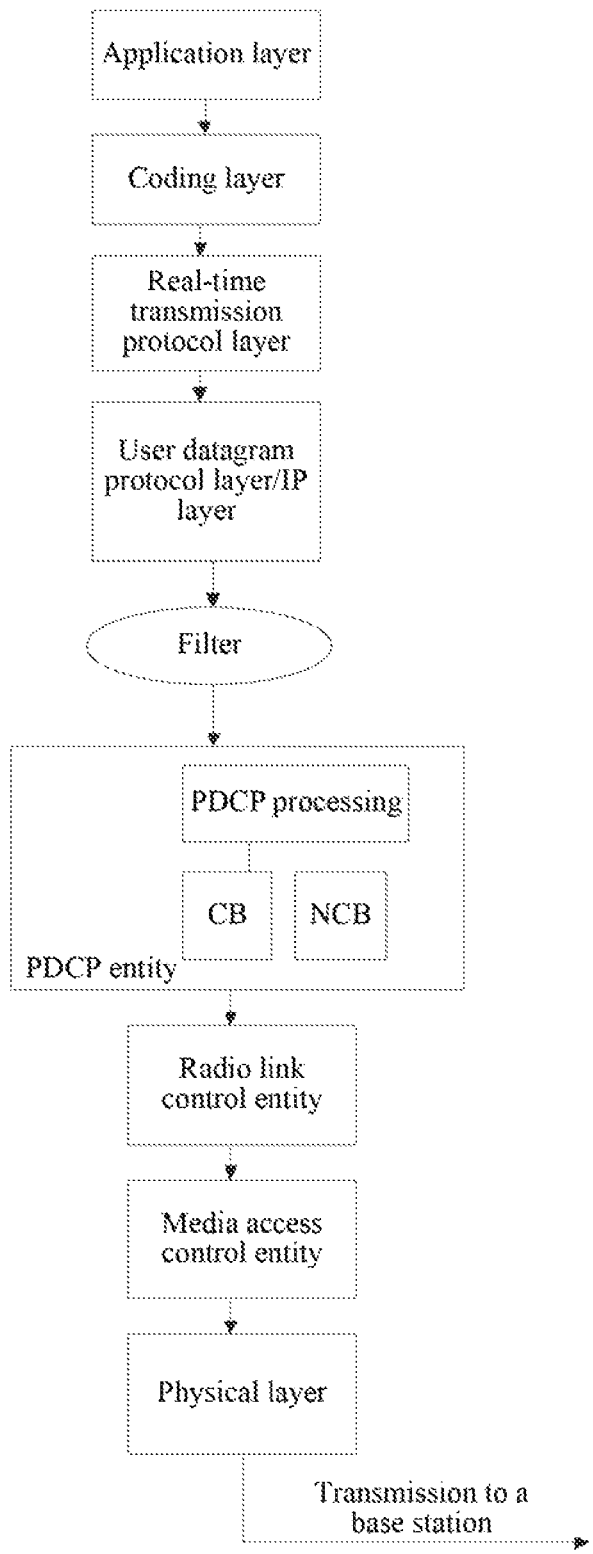
FIG. 2a is a schematic structural diagram 1 of a terminal according to an embodiment of the present application.

It may be understood that, a communications device in the embodiment of the present application may be a base station or may be a terminal. In the following description, a structure of the communications device is described by using an example in which the communications device is a terminal. FIG. 2a is a schematic structural diagram of a terminal according to an embodiment of the present application. As shown in FIG. 2a, the terminal provided in the embodiment of the present application includes an application (APP) layer, a coding layer, a real-time transfer protocol (real-time transport protocol, RTP) layer, a user datagram protocol (UDP)/IP layer, a filter, a data radio bearer (DRB), and a physical (PHY) layer.

The DRB is configured to transmit user plane data. The DRB includes: a packet data convergence protocol (PDCP) entity, a radio link control (RLC) entity, and a media access control (MAC) entity. The PDCP entity and the RLC entity are connected by using a logical channel, and the RLC entity and the MAC entity are connected by using a logical channel. In the schematic structural diagram of the terminal shown in FIG. 2a, the PDCP entity corresponding to a same to-be-transmitted service has at least two buffers, and the at least two buffers are configured to store data packets having different attributes.

For example, as shown in FIG. 2a, the PDCP entity includes a first buffer and a second buffer. Specifically, the first buffer is configured to store a data packet (which may also be referred to as an important data packet) whose attribute is an important attribute, and the second buffer is configured to store a data packet (which may also be referred to as an unimportant data packet) whose attribute is an unimportant attribute.

The coding layer adopts a video compression standard, for example, an H.264 standard. The physical layer is configured to send a data packet scheduled by the PDCP entity or the MAC entity.

The H.264 standard is a highly compacted digital video codec standard jointly proposed by the international telecommunication union-telecommunication standardization sector (ITU-T) and the international standardization organization (ISO)/IEC.

The following briefly describes compositions of a message and a sending mechanism in the H.264 standard: The H.264 standard uses a layer mode. For example, the H.264 standard is divided into two layers, namely, a video coding layer (VCL) and a network abstraction layer (NAL). The VCL is responsible for video content compression. The NAL is responsible for packaging compressed data to adapt to transmission requirements in different network environments.

All to-be-transferred services including image data and other messages in the H.264 standard are encapsulated into packets of a uniform format, namely, network abstraction layer units (NALU), for transferring. The NALU can carry various data packets that have various attributes and that are processed based on H.264, and the NALU may be original encoding stream data, a sequence parameter set (SPS), or a picture parameter set (PPS). A NALU structure is shown in FIG. 2b.

Figure 2B:
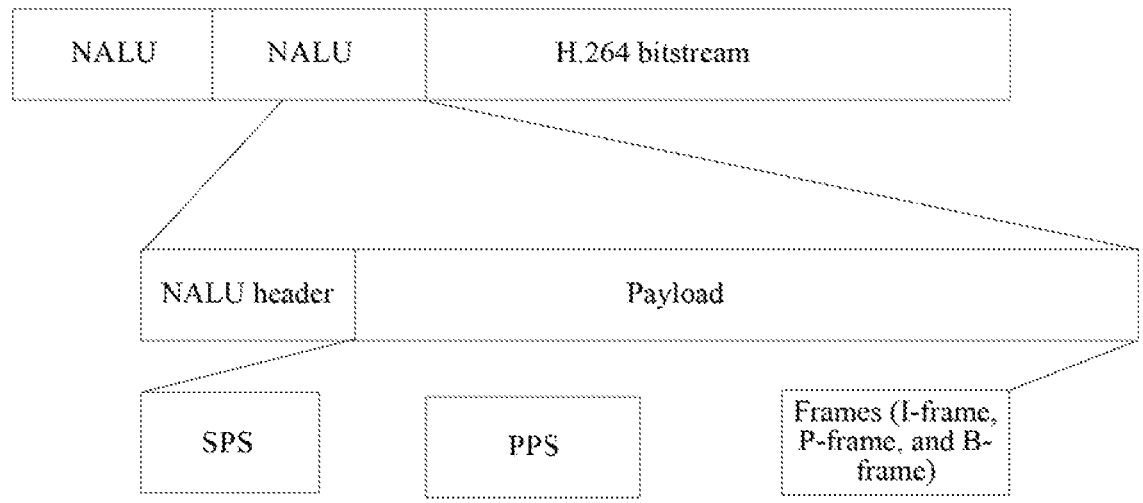
FIG. 2b is a schematic structural diagram 1 of a NALU according to an embodiment of the present application.

In the NALU structure shown in FIG. 2b, a structure of a NALU header field is shown in Table 1:

TABLE 1

| nal_unit(NumBytesInNALunit){ | C | Descriptor |
|---|---|---|
| forbidden_zero_bit | All | F (1) |
| nal_ref_ide | All | U (2) |
| nal_unit_type | All | U (5) |
| NumBytesInRBSP=0 | | |
| For (i=1;i<NumBytesInNALunit;i++){ | | |
| If (i+2<NumBytesInNALunit&&next_bits(24)==0x000003){ | | |
| rbsp_byte[NumBytesInRBSP++] | All | B (8) |
| rbsp_byte[NumBytesInRBSP++] | All | B (8) |
| i+=2 | | |
| emulation_prevention_three_type/*equal to 0x03*/ | All | F (8) |
| }else | | |
| rbsp_byte[NumBytesInRBSP++] | All | B (8) |
| } | | |
| } | | |

As shown in Table 1, the NALU header occupies one byte. An nal_unit_type field in the NALU header is used to indicate a type of the NALU:

For example, when nal_unit_type=1, it indicates that the NALU carries a data packet (for example, a B-frame or a P-frame) in which NAL data has an attribute of an unimportant attribute.

When nal_unit_type=5, it indicates that the NALU carries a data packet (for example, an I-frame) in which NAL data has an attribute of an important attribute.

That is, the terminal can identify, based on a parameter carried in the nal_unit_type field in the NALU header, whether the NAL data carried in the NALU is the I-frame or the B/P-frame.

Currently, the H.264 standard is carried on an RTP layer, and an encoded NALU is sent to the RTP layer for packaging. If NALU data has a length less than 1400 bytes, one RTP data packet may include only one complete NALU, or may include a plurality of NALUs. If the NALU data has a length greater than 1400 bytes, one RTP data packet includes only a part of a NALU, in other words, one NALU may be divided into a plurality of RTP data packets. That is, data carried in an RTP data packet is either an important data packet (for example, the I-frame) or an unimportant data packet (for example, the P-frame or the B-frame). Data packets having two different attributes cannot be mixed in an RTP data packet, that is, a plurality of frame types cannot be mixed in an RTP data packet.

Figure 2C:
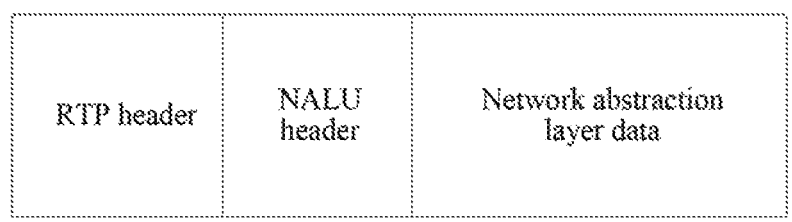
FIG. 2c is a schematic structural diagram 2 of a NALU according to an embodiment of the present application.

An RTP data packet obtained after data passes through the RTP layer carries an RTP header, a NALU header, and NAL data, as shown in FIG. 2c. Indication information carried in the RTP header is used to indicate a type of the NAL data (data packet) carried in the RTP data packet.

Figure 2D:
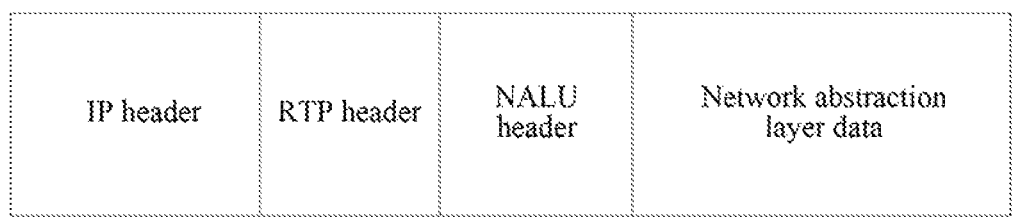
FIG. 2d is a schematic structural diagram 3 of a NALU according to an embodiment of the present application.

The RTP data packet formed on the RTP layer is transferred to a user datagram protocol (UDP) layer or an IP layer. After the RTP data packet is encapsulated into the UDP packet, the UDP packet is then encapsulated into an IP packet, and the formed IP data packet carries an IP header, an RTP header, a NALU header, and NAL data, as shown in FIG. 2d.

A TOS field in the IP header may carry one-bit indication information, and the terminal may indicate an attribute of a data packet carried in the IP data packet by using the one-bit indication information carried in the IP header.

The terminal transmits, to the PDCP entity, a to-be-transmitted data packet obtained from the IP layer (an IP data packet carrying an IP header), and the PDCP entity of the terminal maps an important data packet to the first buffer and maps an unimportant data packet to the second buffer based on the one-bit indication information carried in the IP header of the IP data packet. The PDCP entity includes the received data packet and PDCP header information and is sent to the RLC entity, and the RLC entity reassembles, cuts, and reorders, based on an indication of the MAC entity, data frames processed by the PDCP entity and sends the data frames by using the physical layer.

Figure 2E:
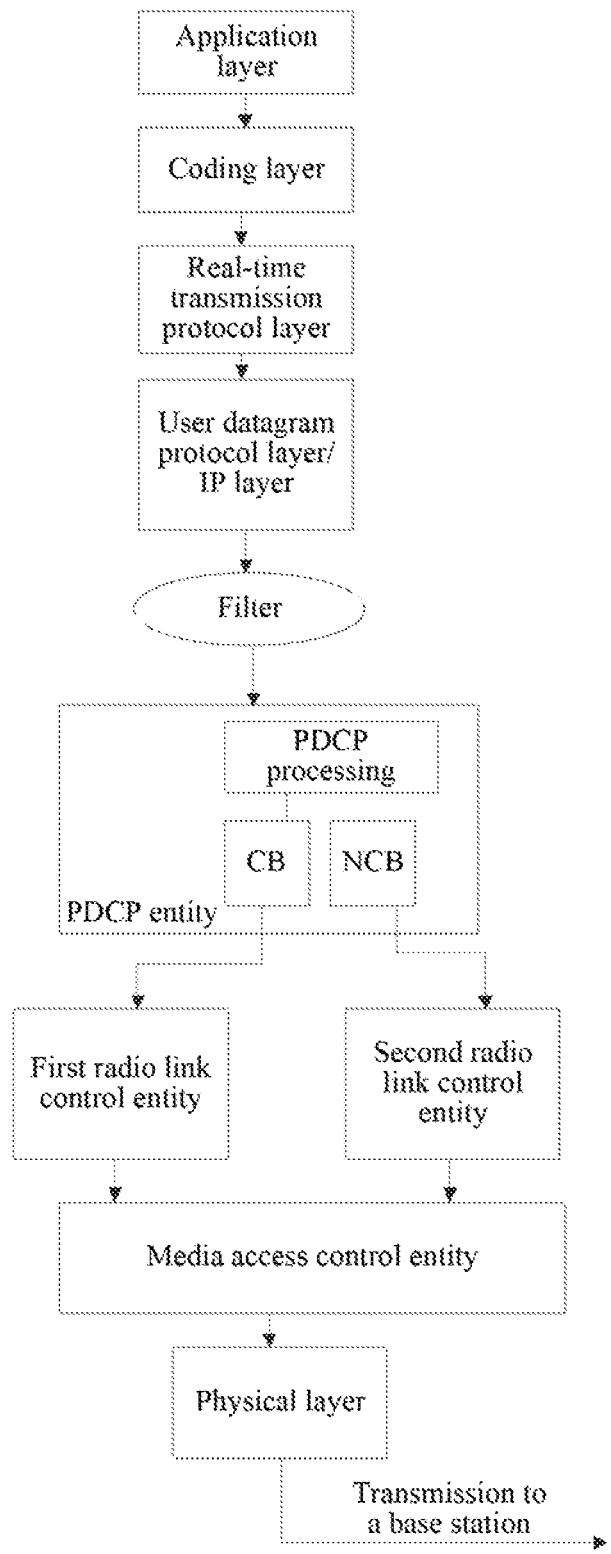
FIG. 2e is a schematic structural diagram 2 of a terminal according to an embodiment of the present application.

FIG. 2e is a schematic structural diagram of another terminal according to an embodiment of the present application. A difference between FIG. 2e and FIG. 2a lies in that, in FIG. 2a, one DRB corresponds to one RLC entity, and in FIG. 2e, one DRB corresponds to at least two RLC entities, and the at least two RLC entities are configured to store data packets having different attributes. Each of the at least two RLC entities is connected to the MAC entity by using a logical channel, different RLC entities correspond to different logical channels, and a logical channel corresponding to an RLC entity is used to indicate an attribute of a data packet mapped to the RLC entity.

Specifically, the PDCP entity determines, based on the one-bit indication information carried in the TOS field in the IP header, the attribute of the to-be-transmitted data packet obtained from the IP layer, and maps the to-be-transmitted data packet to a corresponding RLC entity based on the attribute of the to-be-transmitted data packet.

For example, an example in which the at least two RLC entities are a first RLC entity and a second RLC entity is used in the embodiment of the present application for description: A data packet whose attribute is an important attribute is mapped to the first RLC entity, and a data packet whose attribute is an unimportant attribute is mapped to the second RLC entity. When identifying, based on the one-bit indication information carried in the TOS field in the IP header, that the transmission data packet is an important data packet, the PDCP entity maps the transmission data packet to the first RLC entity, or when identifying that the transmission data packet is an unimportant data packet, the PDCP entity maps the transmission data packet to the second RLC entity, so that data packets having different importance are mapped to different RLC entities. The first RLC entity is connected to the MAC entity through a first logical channel, and the second RLC entity is connected to the MAC entity through a second logical channel.

It may be understood that, an important data packet and an unimportant data packet correspond to a same PDCP entity, so that a receive end performs processing such as synchronization/reordering on the important data packet and the unimportant data packet on the PDCP entity. If an important data packet and an unimportant data packet correspond to different RLC entities, different re-ordering (T-re-ordering) timers may be configured.

Figure 2F:
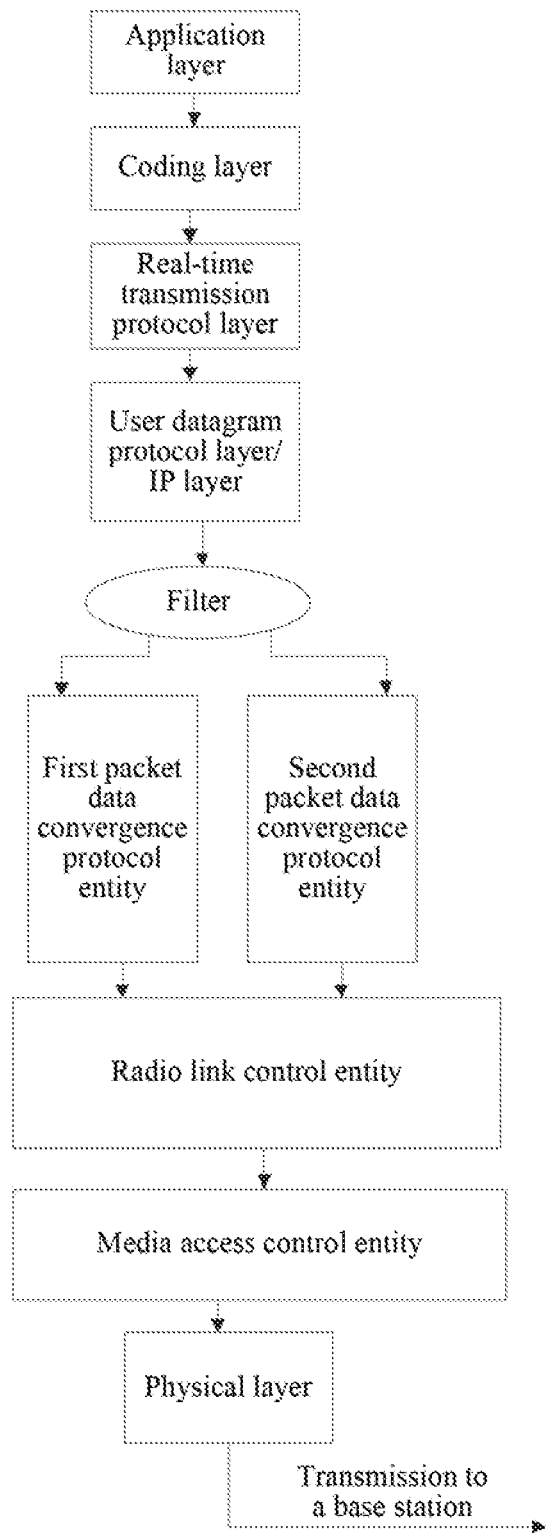
FIG. 2f is a schematic structural diagram 3 of a terminal according to an embodiment of the present application.

FIG. 2f is a schematic structural diagram of another terminal according to an embodiment of the present application. A difference between FIG. 2f and FIG. 2a lies in that, in FIG. 2a, one DRB corresponds to one PDCP entity, and in FIG. 2f, one DRB corresponds to at least two PDCP entities, and each of the at least two PDCP entities is configured to store data packets having one attribute. Data packets stored in a same PDCP entity have a same attribute, and data packets stored in different PDCP entities have different attributes.

For example, an example in which the at least two PDCP entities are a first PDCP entity and a second PDCP entity is used in the embodiment of the present application for description. A data packet whose attribute is an important attribute is stored in the first PDCP entity, and a data packet whose attribute is an unimportant attribute is stored in the second PDCP entity.

Specifically, the terminal identifies, based on a one-bit instruction in a TOS field in an IP header in an IP data packet, whether an attribute of the IP data packet is the important attribute or the unimportant attribute. If determining that the attribute of the IP data packet is the important attribute, the terminal maps the IP data packet to the first PDCP entity; or if determining that the attribute of the IP data packet is the unimportant attribute, the terminal maps the IP data packet to the second PDCP entity. Specifically, the first PDCP entity and the second PDCP entity in the embodiment of the present application each have a buffer. The buffer in the first PDCP entity is configured to store important data packets, and the buffer in the second PDCP entity is configured to store unimportant data packets.

Figure 2G:
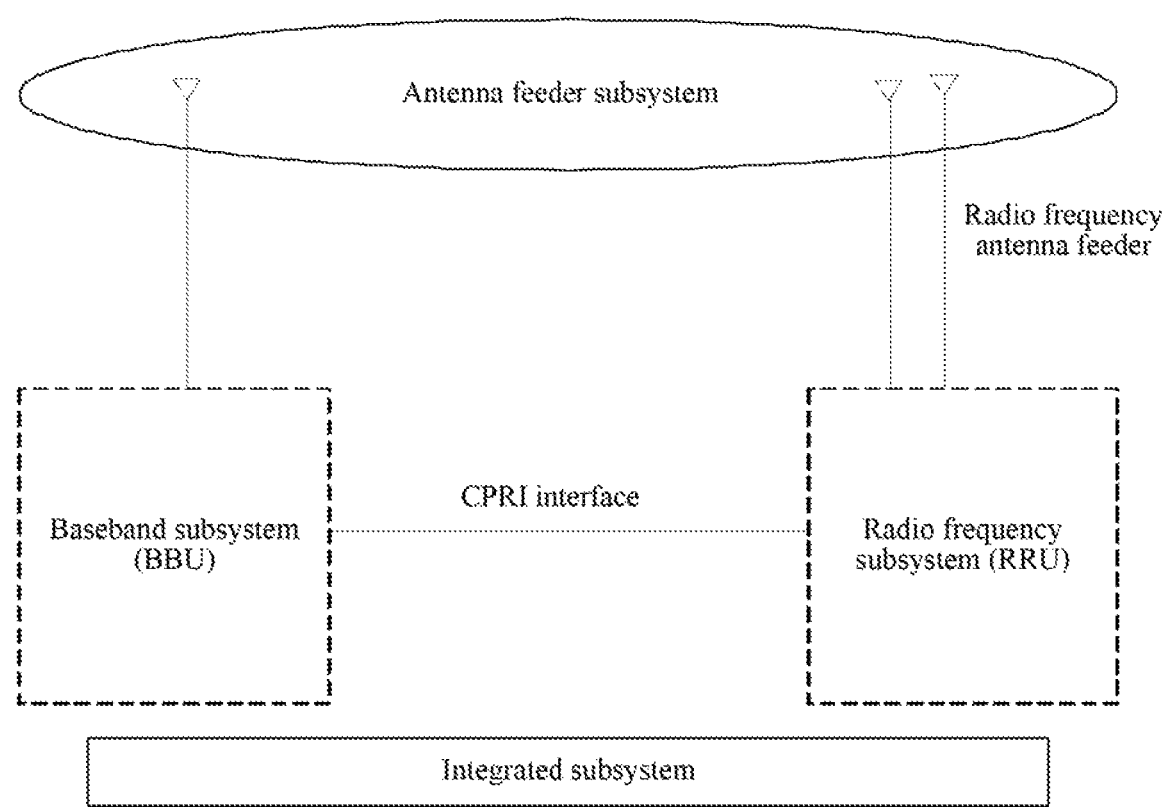
FIG. 2g is a schematic structural diagram 2 of a base station according to an embodiment of the present application.

FIG. 2g is a structural diagram of hardware of a base station according to an embodiment of the present application. As shown in FIG. 2g, the base station includes a baseband subsystem, a radio frequency subsystem, an antenna feeder subsystem, and some support structures (for example, an integrated subsystem). The baseband subsystem is configured to: implement operation and maintenance of the entire base station, implement signaling processing, radio resource management, a transmission interface to a packet core network, and implement a physical layer, a media access control layer, L3 signaling, and a main control function of operation and maintenance. The radio frequency subsystem implements conversion between a baseband signal, an intermediate-frequency signal, and a radio frequency signal, and implements demodulation of a wireless received signal and modulation and power amplification of a sending signal. The antenna feeder subsystem includes an antenna and a feeder that are connected to a radio frequency module of the base station, and an antenna and a feeder of a GRS receiving card, and is configured to receive and send an air interface signal. The integrated subsystem is a support portion of the baseband subsystem and the radio frequency subsystem, and provides a structure, power supply, and an environment monitoring function.

Figure 2H:
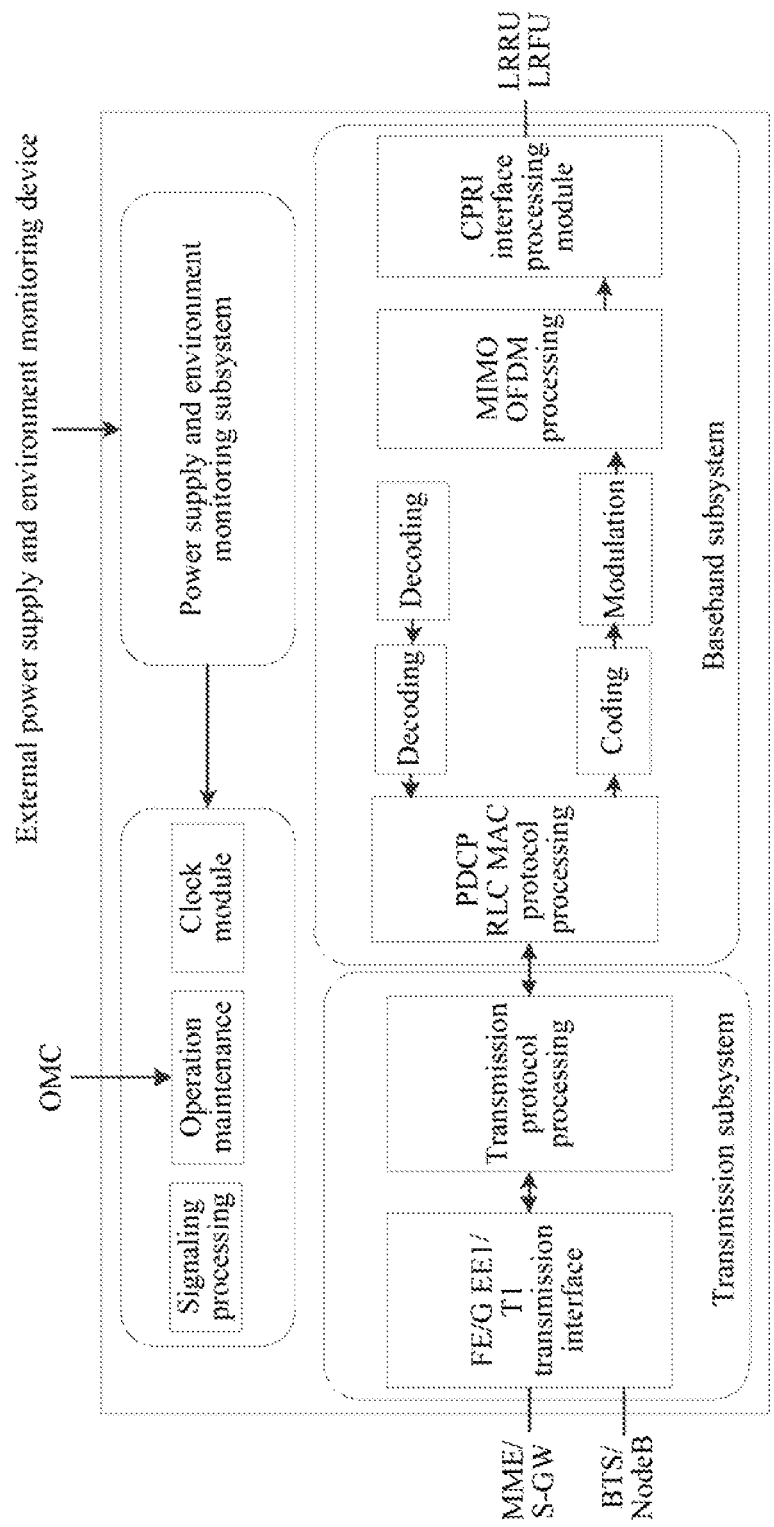
FIG. 2h is a schematic structural diagram 3 of a base station according to an embodiment of the present application.

The baseband subsystem may be shown in FIG. 2h. For example, when a mobile phone needs to get onto Internet, the mobile phone accesses a core network by using the base station, and then accesses the Internet by using the core network. Data on the Internet is transferred to a baseband part by using an interface between the core network and the base station. The baseband part performs processing such as encoding and modulation on the data on a PDCP layer, an RLC layer, and a MAC layer, and delivers the data to a radio frequency part, and the radio frequency part emits the data to user equipment. The baseband may be connected to the radio frequency by using a CPRI interface. In addition, the radio frequency part may be placed remotely by using an optical fiber, for example, a remote RRU. Operations of the data transmission method in the embodiment of the present application are implemented by the baseband through radio frequency, and operations of receiving and sending are implemented by using an antenna (for example, an air interface).

An interface between the user equipment and the base station in the embodiment of the present application may be understood as an air interface for communication between the user equipment and the base station, or may be referred to as a Uu interface.

Figure 3:
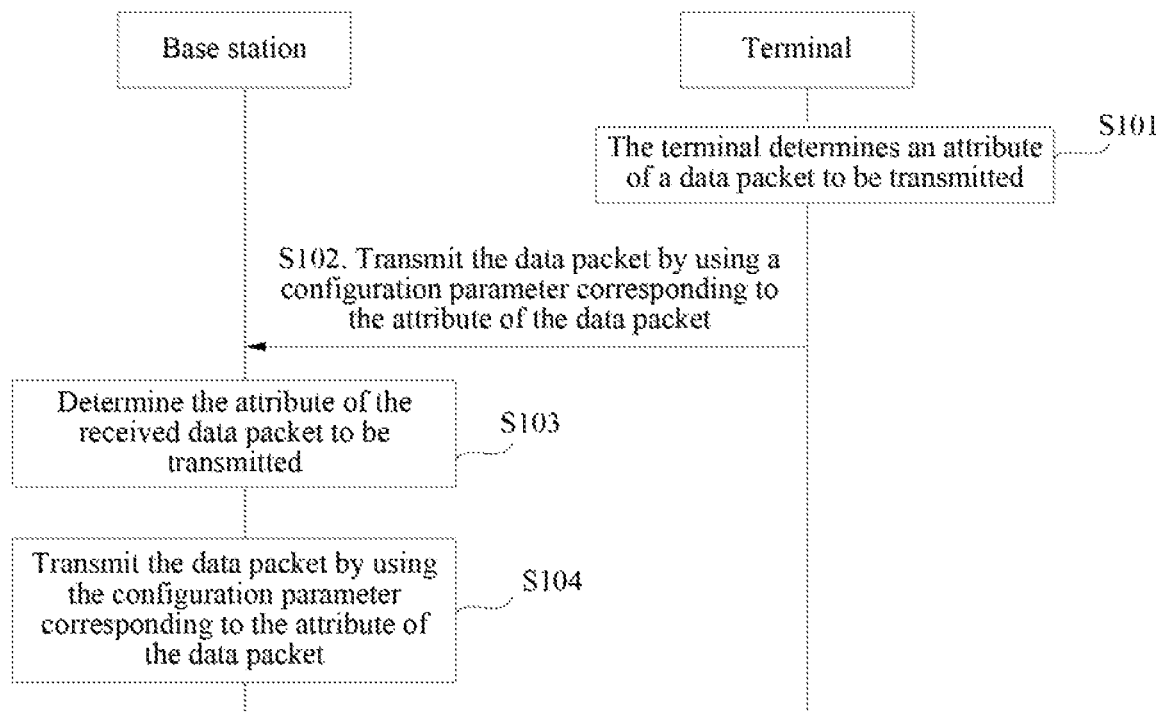
FIG. 3 is a schematic flowchart 1 of a data transmission method according to an embodiment of the present application.

FIG. 3 is a schematic flowchart of a data transmission method according to an embodiment of the present application, and the method includes the following operations.

S101. A terminal determines an attribute of a data packet to be transmitted, where the attribute of the data packet is used to indicate importance of the data packet The data packet to be transmitted in the embodiment of the present application may be any data packet in a to-be-transmitted service (for example, a video transmission service or another to-be-transmitted service).

For example, an example in which the data packet to be transmitted is any data packet in the video transmission service is used in the embodiment of the present application for description. The video transmission service may be encoded into an I-frame, a P-frame, and a B-frame according to the H.264 standard, and then the I-frame, the P-frame, and the B-frame are data packets having different attributes.

If an attribute of a data packet is an important attribute, it indicates that the data packet needs to be scheduled at a high priority in a transmission process (which may also be understood as that the data packet has a relatively high priority level), or the data packet cannot be lost in the transmission process. If the data packet of the important attribute is lost in the transmission process, the to-be-transmitted service is incomplete.

If an attribute of a data packet is an unimportant attribute, it indicates that the data packet can be lost or has a relatively low priority level in a transmission process, or after the data packet having an unimportant attribute is lost, the to-be-transmitted service is not affected.

Specifically, in the video transmission service, the I-frame can be independently decoded without referring to other frame data, but the P-frame and the B-frame need to depend on the I-frame to complete decoding and the P-frame and the B-frame cannot be decoded without the I-frame. Therefore, the I-frame may be determined as a data packet whose attribute is the important attribute, and the P-frame and the B-frame are determined as data packets whose attribute is the unimportant attribute.

S102. The terminal transmits the data packet by using a configuration parameter corresponding to the attribute of the data packet S103. A base station determines the attribute of the received data packet to be transmitted.

S104. The base station transmits the data packet by using the configuration parameter corresponding to the attribute of the data packet.

According to the data transmission method provided in the embodiment of the present application, the attribute of the data packet to be transmitted is determined, and then the data packet is transmitted by using the configuration parameter corresponding to the attribute of the data packet. In this way, if attributes of data packets are different, different configuration parameters are used during transmission of the data packets. In the prior art, data packets in a same to-be-transmitted service are transmitted by using a same configuration parameter, and in the embodiment of the present application, data packets included in a to-be-transmitted service are transmitted based on attributes by using configuration parameters corresponding to the data packets. Therefore, data packets having different attributes correspond to different configuration parameters, and the data packets having different attributes can be distinguished to improve reliability of a to-be-transmitted data packet having relatively high importance, thereby reducing impact caused by a case such as a congested network on transmission quality of the to-be-transmitted service.

Figure 4:
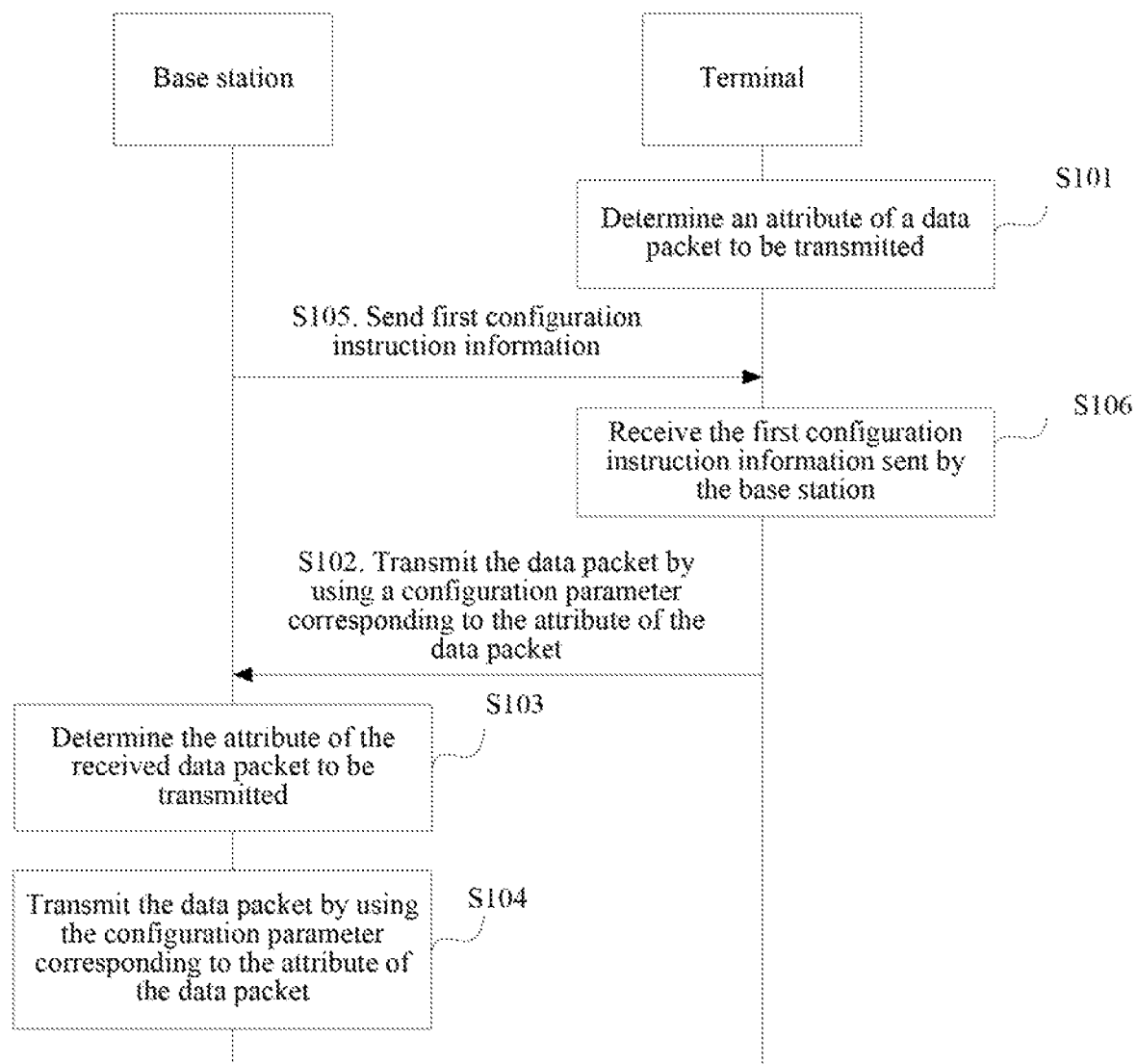
FIG. 4 is a schematic flowchart 2 of a data transmission method according to an embodiment of the present application.

With reference to FIG. 3, as shown in FIG. 4, before operation S102, the embodiment of the present application further includes:

S105. The base station sends first configuration instruction information to the terminal, where the first configuration instruction information is used to instruct the terminal to configure different configuration parameters for data packets having different attributes, and the configuration parameters include different HARQ parameter values or different discard timing lengths.

S106. The terminal receives the first configuration instruction information sent by the base station.

The terminal in the embodiment of the present application may determine, based on the first configuration instruction information sent by the base station, a configuration parameter corresponding to each data packet, or may actively configure a configuration parameter for each data packet based on an attribute of the data packet. When the terminal actively configures the configuration parameter for each data packet based on the attribute of the data packet, operations S105 and S106 may be omitted.

Specifically, the base station may send the first configuration instruction information to the terminal by using a radio resource control (RRC) message.

Optionally, in a possible implementation, the first configuration instruction information may carry a configuration parameter (an important data packet and an unimportant data packet are used as an example for description) corresponding to each of a plurality of attributes. The RRC message carries a maxHARQ-Tx field and a minHARQ-Tx field, which are used to instruct the terminal to limit a maximum quantity of times of uplink retransmission of data packets having different importance. For example, the maxHARQ-Tx field is used to instruct the terminal to limit a maximum quantity of times of uplink retransmission of an important data packet; and the minHARQ-Tx field is used to instruct the terminal to limit a maximum quantity of times of uplink retransmission of an unimportant data packet. After receiving the first configuration instruction information, the terminal configures the maximum quantity of times of uplink retransmission corresponding to the important data packet based on a parameter carried in the maxHARQ-Tx field, and configures the maximum quantity of times of uplink retransmission corresponding to the unimportant data packet based on a parameter carried in the minHARQ-Tx field.

Optionally, in another possible implementation, the first configuration instruction information does not carry the configuration parameter corresponding to each attribute, and in this case, after the terminal receives the first configuration instruction information, the terminal obtains the configuration parameter corresponding to each attribute from a preset mapping table. The preset mapping table stores a mapping relationship between each attribute and the configuration parameter. For example, as shown in Table 2:

TABLE 2

| Preset mapping table | |
|---|---|
| Attribute | Configuration parameter |
| First attribute | First configuration parameter |
| Second attribute | Second configuration parameter |
| Third attribute | Third configuration parameter |

Only as an example, Table 2 only shows a first attribute, a second attribute, and a third attribute. It may be understood that in an actual process, the attribute may include a plurality of attributes in addition to the first attribute, the second attribute, and the third attribute. The first attribute, the second attribute, and the third attribute have different importance. For example, importance of the first attribute is lower than importance of the second attribute, the importance of the second attribute is lower than importance of the third attribute; or importance of the first attribute is higher than importance of the second attribute, and the importance of the second attribute is higher than importance of the third attribute.

Optionally, the terminal may determine the configuration parameter corresponding to each attribute from Table 2. For example, after receiving the first configuration instruction information, the terminal may configure, based on Table 2, a first configuration parameter for a data packet whose attribute is a first attribute, and configure a second configuration parameter for a data packet whose attribute is a second attribute. When the terminal actively configures, for each data packet based on an attribute of the data packet, the configuration parameter corresponding to the attribute of the data packet, the terminal may directly determine the configuration parameter of the data packet based on Table 2.

Figure 5:
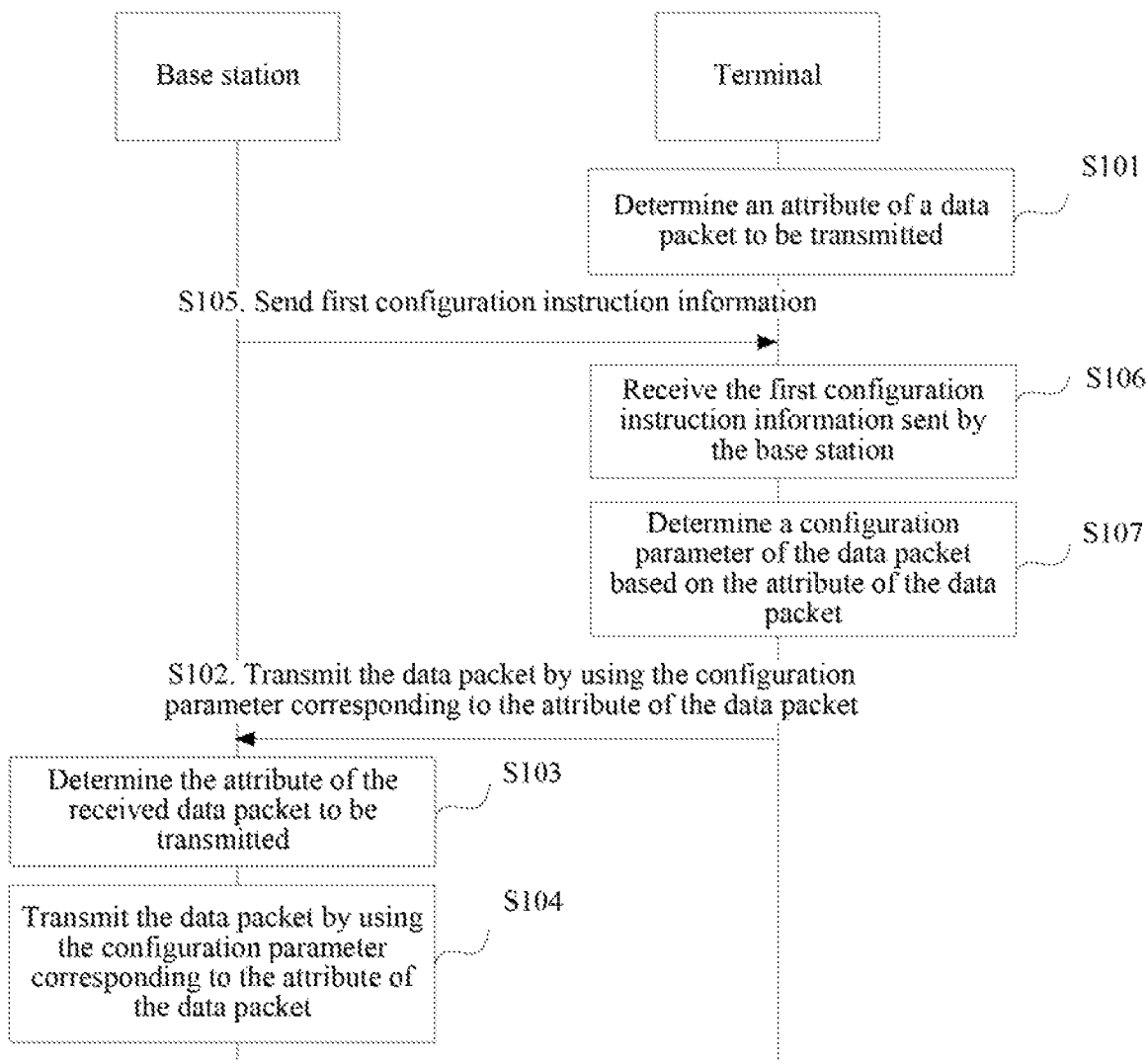
FIG. 5 is a schematic flowchart 3 of a data transmission method according to an embodiment of the present application.

Optionally, with reference to FIG. 3 and FIG. 4, before operation S102 in the embodiment of the present application, as shown in FIG. 5, the embodiment of the present application further includes operation S107:

S107. The terminal determines the configuration parameter of the data packet based on the attribute of the data packet.

To ensure transmission reliability of a data packet having relatively high importance, in the embodiment of the present application, a relatively large configuration parameter may be configured for an attribute having relatively high importance, and a relatively small configuration parameter may be configured for an attribute having relatively low importance. In this way, when a network is congested, reliable transmission of the data packet having relatively high importance can be ensured. For example, in the embodiment of the present application, data packets that have different attributes and that are in a same to-be-transmitted service may be sorted in descending order of importance, and then the corresponding configuration parameter is configured for each data packet based on the configuration parameter corresponding to the attribute of the data packet.

The following describes an example in which an attribute is an important attribute or an unimportant attribute, and in actual use, the attribute may further include other attributes in addition to the important attribute or the unimportant attribute. This is not limited in the embodiment of the present application.

In at least one embodiment, the configuration parameter is a hybrid automatic repeat request HARQ parameter, and operation S107 provided in the embodiment of the present application may be implemented in the following manner:

S1071a. The terminal determines that the configuration parameter of the data packet is a first HARQ parameter or a second HARQ parameter, where the first HARQ parameter is a configuration parameter corresponding to the important attribute, the second HARQ parameter is a configuration parameter corresponding to the unimportant attribute, and a value of the first HARQ parameter is greater than a value of the second HARQ parameter.

In the embodiment of the present application, when the attribute of the data packet is the important attribute, the terminal configures the first HARQ parameter for the data packet, and when the attribute of the data packet is the unimportant attribute, the terminal configures the second HARQ parameter for the data packet. The first HARQ parameter is greater than the second HARQ parameter, and in this case, transmission reliability of the data packet whose attribute is the important attribute can be ensured. Moreover, when the terminal determines that uplink transmission reaches a HARQ parameter (for example, the second HARQ parameter) configured for the data packet whose attribute is the unimportant attribute, if the data packet whose attribute is the unimportant attribute has not been correctly received, the terminal discards the data packet whose attribute is the unimportant attribute and no longer retransmits the data packet whose attribute is the unimportant attribute. Therefore, it can be ensured that when a network is congested, the data packet whose attribute is the unimportant attribute does not occupy transmission resources.

Specifically, for example, a to-be-transmitted service includes a first data packet and a second data packet. If the first data packet is a video I-frame, and the second data packet is a video P-frame or B-frame, the terminal configures the first HARQ parameter for the I-frame, and for example, the first HARQ parameter is 5; the terminal configures the second HARQ parameter for the P-frame or the B-frame, and for example, the second HARQ parameter is 1. Then, after initial transmission of the I-frame fails, the terminal retransmits the I-frame, and can retransmit the I-frame for five times at most. After a quantity of times of retransmission of the I-frame by the terminal reaches the first HARQ parameter, and retransmission of the I-frame still fails, the terminal no longer retransmits the I-frame. After transmission of the P-frame or the B-frame fails, the terminal retransmits the P-frame or the B-frame, and can retransmit the P-frame or the B-frame for one time at most. After a quantity of times of retransmission of the P-frame or the B-frame by the terminal reaches the second HARQ parameter, and retransmission of the P-frame or the B-frame still fails, the terminal no longer retransmits the P-frame or the B-frame.

Specifically, the first HARQ parameter and the second HARQ parameter in the embodiment of the present application may be configured as required. To ensure that an important data packet is transmitted as successful as possible, a value of the first HARQ parameter should be set as relatively large as possible, and when network transmission resources remain unchanged, to reduce impact caused by occupation of transmission resources by an unimportant data packet on network quality when a network is congested, a value of the second HARQ parameter should be set as relatively small as possible. Certainly, the second HARQ parameter may also be set to 0, that is, once transmission of the unimportant data packet fails, retransmission is not performed.

To avoid that data is buffered in an eNodeB or the terminal for an excessively long time, in a long term evolution (LTE) system, a discard timer (DT) is configured for each PDCP entity, and each discard timer corresponds to a discard timing length. For the terminal, the discard timing length of the timer is configured by the eNodeB. Each time the PDCP entity receives a PDCP SDU, the PDCP entity enables a timer, and when the timer is timed out, the PDCP SDU and a corresponding PDCP PDU are discarded.

In at least one embodiment, the configuration parameter is a discard timing length, and operation S107 provided in the embodiment of the present application may be implemented in the following manner:

S1071b. The terminal determines that the configuration parameter of the data packet is a first discard timing length or a second discard timing length, where the first discard timing length is a configuration parameter corresponding to the important attribute, the second discard timing length is a configuration parameter corresponding to the unimportant attribute, and the first discard timing length is greater than the second discard timing length.

Specifically, the base station may configure at least two discard timers for a PDCP entity corresponding to a to-be-transmitted service of the terminal by using an RRC message, and each discard timer corresponds to a discard timing length. For example, in the embodiment of the present application, two discard timers are configured, that is, a first discard timer corresponds to the first discard timing length, and a second discard timer corresponds to the second discard timing length.

For example, data packets that have different attributes and that are in a same to-be-transmitted service are sorted in descending order of importance, and then a discard timer configured for a data packet having high importance corresponds to a relatively long discard timing length, and a discard timer configured for a data packet having low importance corresponds to a relatively short discard timing length.

For example, in the embodiment of the present application, a discard timing length of the important attribute may be configured to be greater than a discard timing length of the unimportant attribute. In this way, it can be ensured that when a network is congested, and the discard timing length of the unimportant attribute is reached, a data packet corresponding to the unimportant attribute is discarded, so that when the network transmission resources remain unchanged, normal transmission of a data packet corresponding to the important attribute is ensured and not lost, thereby reducing impact on transmission quality.

For example, the data packet corresponding to the important attribute is an I-frame, and the data packet corresponding to the unimportant attribute is a P-frame or a B-frame. Then, the terminal configures a first discard timing length for the I-frame, and for example, the first discard timing length is 50s (S); and the terminal configures a second discard timing length for the P-frame or the B-frame, and for example, the second discard timing length is 10s. Each time the PDCP entity receives a PDCP service data unit (SDU), the PDCP entity enables, based on an attribute of the PDCP SDU, a timer corresponding to the attribute of the PDCP SDU. For example, if the attribute of the PDCP SDU is the important attribute, the PDCP entity enables a timer corresponding to the important attribute, and when the discard timing length configured for the timer is expired, the PDCP SDU and a corresponding PDCP PDU are discarded.

Optionally, with reference to FIG. 3, on one hand, operation S101 may be implemented in the following manner:

S1011a. The terminal receives, on a media access control MAC entity of the terminal, first indication information sent by a packet data convergence protocol PDCP entity of the terminal to the MAC entity, where the first indication information is used to indicate the attribute of the data packet received by the terminal.

Specifically, the media access control MAC entity of the terminal receives the first indication information sent by the packet data convergence protocol PDCP entity of the terminal, where the first indication information is used to indicate the attribute of the data packet that is received by the MAC entity at a current moment.

For example, with reference to FIG. 2a, the terminal divides a to-be-transmitted service into a first data packet and a second data packet by using a protocol layer, combines the first data packet and the second data packet into an RTP packet by using an RTP layer, and sends the RTP packet to an IP layer. The terminal adds an IP header to each of the first data packet and the second data packet on the IP layer, and distinguishes between attributes of the first data packet and the second data packet by using a TOS field in the IP header. For example, the IP header of the first data packet carries first identification information, and the first identification information is used to indicate that the attribute of the first data packet is the important attribute. The IP header of the second data packet carries second identification information, and the second identification information is used to indicate that the attribute of the second data packet is the unimportant attribute. Then, the terminal transfers the first data packet and the second data packet carrying the IP headers from the IP layer to the PDCP entity. After the PDCP entity receives the first data packet and the second data packet carrying the IP headers, the PDCP entity determines the attribute of the first data packet and the attribute of the second data packet based on the first identification information and the second identification information that are in the IP headers of the first data packet and the second data packet. After determining that the attribute of the first data packet is the important attribute, the terminal buffers the first data packet to the first buffer shown in FIG. 2a, and buffers the second data packet to the second buffer shown in FIG. 2a, and the first data packet and the second data packet are not sent to the RLC entity. After the PDCP entity receives indication information of an attribute of a data packet that needs to be scheduled at a current moment and an uplink grant (UL Grant) that are sent by the MAC entity, the PDCP entity sends data in the corresponding buffers to the RLC entity. For example, the MAC entity sends the data packet that needs to be scheduled at the current moment and whose attribute is the important attribute, the PDCP entity sends the first data packet from the first buffer to the RLC entity, and then the RLC entity sends the first data packet to the MAC entity. In this case, the PDCP entity sends the first indication information to the MAC entity, where the first indication information is used to indicate that the attribute of the first data packet received by the MAC entity is the important attribute. In this case, the terminal may transmit the first data packet by using the first HARQ parameter.

On the other hand, operation S101 may be implemented in the following manner:

S1011b. The terminal determines the attribute of the data packet based on an RLC header of the data packet, where the RLC header carries an identifier that uniquely identifies the attribute of the data packet.

It may be understood that, after the terminal divides the to-be-transmitted service into a plurality of data packets, the plurality of data packets are transmitted through the IP layer, generated as data packets carrying IP headers, and sent to the PDCP layer. The IP header carries identification information indicating that the attribute of the data packet is the important attribute or the unimportant attribute. After receiving an IP packet, the PDCP layer learns of the attribute of the data packet based on the identification information in the IP header, generates the data packet carrying the PDCP header, and sends the data packet to the RLC entity. The PDCP header carries identification information indicating that the attribute of the data packet is the important attribute or the unimportant attribute. After receiving the data packet sent by the PDCP entity, the RLC entity learns, based on identification information in the data packet that carries the PDCP header and that is sent by the PDCP entity, an attribute of the data packet carrying the PDCP header, generates the data packet carrying the RLC header, and sends the data packet to the MAC entity. The RLC header carries identification information indicating that the attribute of the data packet is the important attribute or the unimportant attribute. In this case, the MAC entity of the terminal can determine the attribute of the data packet by using the RLC header of the data packet.

On another hand, the terminal uses the structure shown in FIG. 2e, and operation S101 may further be implemented in the following manners:

S1011c. The terminal determines the attribute of the data packet obtained through a second logical channel as the important attribute.

S1012c. The terminal determines the attribute of the data packet obtained through a second logical channel as the unimportant attribute.

It may be understood that, before operation S101, the method further includes operation S101a: receiving, by the terminal, second indication information delivered by a base station, where the second indication information is used to indicate, to the terminal, a correspondence between data packets having different attributes and logical channels used for transmitting the data packets.

Specifically, the second indication information carries an identifier of each logical channel, and a correspondence between the identifier of the logical channel and an attribute. For example, the second indication information is used to indicate that the first logical channel corresponds to the important attribute and the second logical channel corresponds to the unimportant attribute, and is used to indicate, to the terminal, attributes of data packets transmitted on different logical channels.

Correspondingly, if the communications device is a base station, the base station further includes: sending, second indication information to the terminal, where the second indication information is used to indicate, to the terminal, a correspondence between data packets having different attributes and logical channels used for transmitting the data packets.

Figure 6:
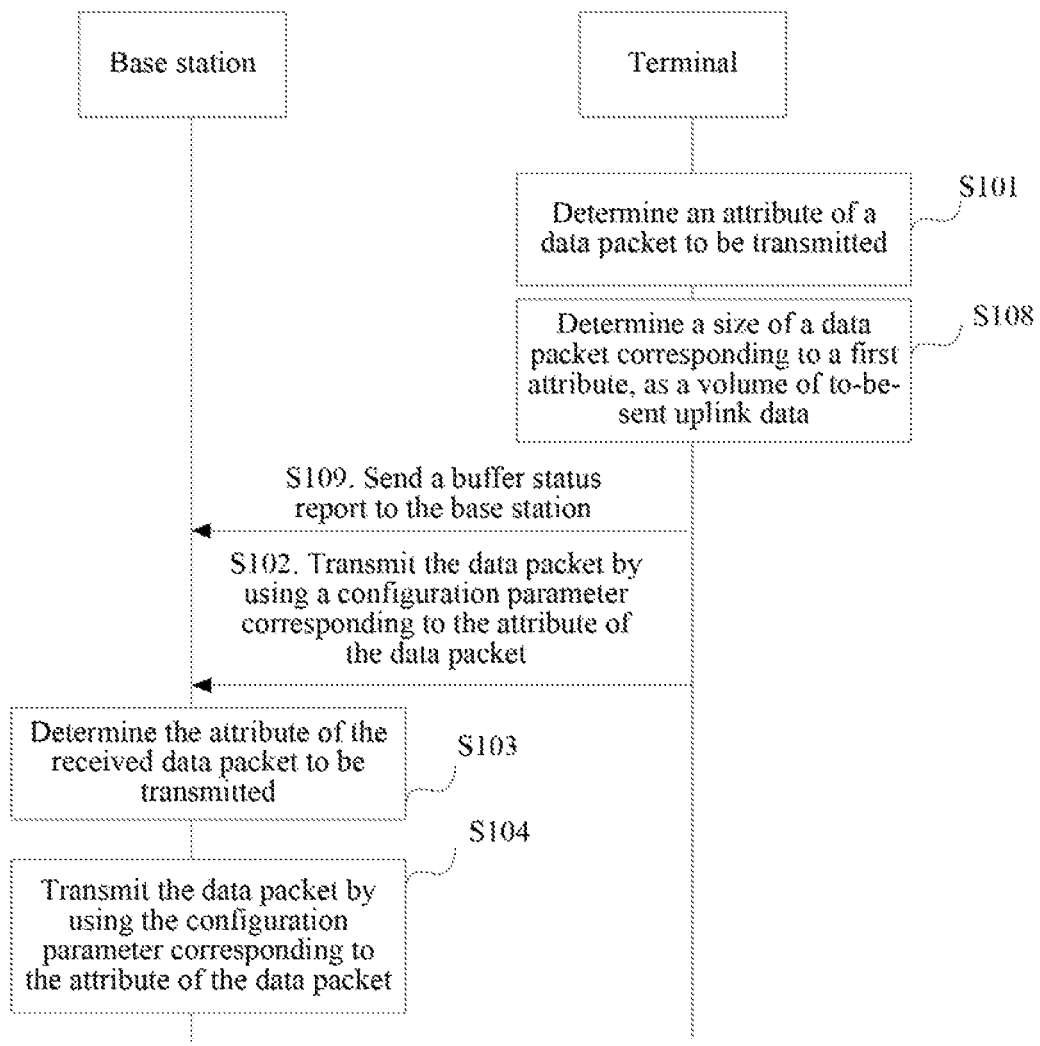
FIG. 6 is a schematic flowchart 4 of a data transmission method according to an embodiment of the present application.

Optionally, with reference to FIG. 3, as shown in FIG. 6, on one hand, before operation S102, the method provided in the embodiment of the present application further includes the following operations.

S108. The terminal determines a data volume of data packets corresponding to a first attribute as a volume of to-be-sent uplink data, where the first attribute is any one of the different attributes included in the to-be-transmitted service.

S109. The terminal reports the volume of to-be-sent uplink data to the base station.

Specifically, in the embodiment of the present application, the terminal reports the volume of to-be-sent uplink data to the base station in a form of a buffer status report (BSR). With the BSR, the base station can learn of a quantity of important data packets or unimportant data packets to be sent by the terminal at the current moment.

Specifically, operation S108 may be implemented in the following manners:

On one hand, the PDCP entity determines scheduling:

After the PDCP entity receives a plurality of data packets included in the to-be-transmitted service, if a data packet whose current scheduling attribute is the first attribute is determined, the data packet whose current scheduling attribute is the first attribute is sent to the RLC entity, and data packets having other attributes than the first attribute in the different attributes are buffered in the PDCP entity, and are to be sent next time. Therefore, in a scenario in which the PDCP entity determines scheduling, the volume of to-be-sent uplink data reported by the terminal to the base station includes only a data volume of the data packets whose attribute is the first attribute and that are obtained by the MAC entity from the RLC entity.

On the other hand, the MAC entity determines scheduling:

After receiving a plurality of data packets included in the to-be-transmitted service, the PDCP entity separately buffers data packets whose attribute is the important attribute or the unimportant attribute (for example, buffers the data packets in the first buffer and the second buffer), and the PDCP entity sends third indication information to the MAC entity by crossing layers. The third indication information is used to indicate a data volume of data packets corresponding to each of the different attributes.

If the MAC entity determines to schedule data packets having the first attribute, the MAC entity obtains, from the third indication information, a data volume of the data packets corresponding to the first attribute, reports the data volume of the data packets corresponding to the first attribute to the base station in a form of a BSR, and waits for a resource allocated by the base station. Once the terminal receives the resource allocated by the base station to the data packets corresponding to the first attribute, the MAC entity of the terminal sends fourth indication information to the PDCP entity. The fourth indication information is used to instruct the PDCP layer to send the data packets corresponding to the first attribute to the RLC entity.

Optionally, when reporting the volume of to-be-sent uplink data to the base station, the terminal may further send fifth indication information to the base station. The fifth indication information is used to indicate whether the volume of to-be-sent uplink data is an uplink data volume of important attribute or an uplink data volume of unimportant attribute.

Specifically, the terminal may indicate, by using a one-bit reservation field in the MAC header, whether the uplink data volume of the important attribute or the unimportant attribute is reported in the BSR.

For example, on one hand, the MAC entity determines scheduling of the current moment. In the structures of the terminals shown in FIG. 2a and FIG. 2e, after receiving data packets from the IP layer, the PDCP entity buffers data packets having different attributes in different buffers. For example, the PDCP entity buffers data packets whose attribute is the important attribute into the first buffer, and buffers data packets whose attribute is the unimportant attribute into the second buffer. The MAC entity sends one piece of indication information to the PDCP entity by crossing layers, to request to learn of a volume of to-be-sent uplink data. After receiving the indication information, the PDCP entity sends one piece of indication information (that is, the third indication information) to the MAC entity by crossing layers. The third indication information carries the data volume of the data packets corresponding to the important attribute and the data volume of the data packets corresponding to the unimportant attribute. After receiving the third indication information, if the MAC entity determines that the data packets corresponding to the important attribute are to be scheduled at the current moment, the data volume that is of the data packets corresponding to the important attribute and that is in the third indication information is reported to the base station in a form of the BSR (moreover, the terminal may send indication information to the base station, to indicate whether the reported volume of to-be-sent uplink data is the data volume of the important attribute or the unimportant attribute); otherwise, the data volume of unimportant data packets and attributes corresponding to the data packets are reported to the base station. Then, the base station may send a UL grant to the terminal. After the terminal receives the UL grant from the base station, the MAC entity of the terminal sends, to the PDCP entity, sixth indication information carrying UL grant information and an attribute of a requested data packet. If a requested attribute in the sixth indication information is the important attribute, in the structure of the terminal shown in FIG. 2a, the PDCP entity sends the data packets buffered in the first buffer to the RLC entity shown in FIG. 2a; or if the attribute of the requested data packet in the sixth indication information is the unimportant attribute according to the sixth indication information, the PDCP entity determines to send the unimportant data packets buffered in the second buffer to the RLC entity shown in FIG. 2a according to the sixth indication information.

In the structure of the terminal shown in FIG. 2e, if the attribute of the data packet requested in the sixth indication information is the important attribute, the PDCP entity sends the important data packets buffered in the first buffer to the first RLC entity shown in FIG. 2e according to the sixth indication information; or if the attribute of the data packet requested in the sixth indication information is the unimportant attribute, the PDCP entity determines to send the unimportant data packets buffered in the second buffer to the second RLC entity shown in FIG. 2e according to the sixth indication information.

In the structure of the terminal shown in FIG. 2f, if the attribute of the data packet requested in the sixth indication information is the important attribute, the PDCP entity determines to send the important data packets buffered in the first buffer of the first PDCP entity to the RLC entity shown in FIG. 2f according to the sixth indication information; or if an attribute of data requested in the sixth indication information is the unimportant attribute, the terminal determines, according to the sixth indication information, to send the data packets buffered in the second buffer of the second PDCP entity to the RLC entity shown in FIG. 2e.

On the other hand, the PDCP entity determines scheduling of the current moment. In the structure shown in FIG. 2a, if scheduling an important data packet, the PDCP entity pushes the important data packet from the first buffer to the RLC entity; otherwise, pushes an unimportant data packet to the RLC entity. In the structure of the terminal shown in FIG. 2e, if the PDCP entity determines to schedule an important data packet, the PDCP entity pushes the important data packet from the first buffer to the first RLC entity; otherwise, pushes an unimportant data packet to the second RLC entity. In the structure of the terminal shown in FIG. 2f, if determining to schedule an important data packet, the PDCP entity pushes the important data packet from the first buffer of the first PDCP entity to the RLC entity; otherwise, pushes an unimportant data packet from the second buffer in the second PDCP entity to the second RLC entity.

On the other hand, when the terminal uses the structure shown in FIG. 2f, the MAC entity of the terminal may obtain, from the first RLC entity, an uplink data volume of the data packets that correspond to the important attribute and that are mapped to the first RLC entity, and send a request to the second RLC entity to determine an uplink data volume of the data packets that correspond to the unimportant attribute and that are mapped to the second RLC entity.

Optionally, on one hand, operation S102 in the embodiment of the present application may be implemented in the following manner:

S1021a. If the MAC entity of the terminal determines that the attribute of the first data packet is the important attribute, when transmission of the first data packet fails, the MAC entity retransmits the first data packet by using the first HARQ parameter.

Specifically, the terminal may determine, in the following manners, that transmission of the first data packet fails.

On one hand, after the terminal sends the first data packet to the base station, if the terminal receives a first response message sent by the base station (for example, a NACK response sent by the base station to the terminal by using a PUCCH), the terminal determines that transmission of the first data packet fails. For example, if the terminal determines that the received first response message carries a NACK, it indicates that transmission of the first data packet fails and the first data packet needs to be retransmitted.

On the other hand, if the terminal determines that within a preset time, the first response message sent by the base station is not received, the terminal determines that transmission of the first data packet fails.

Specifically, the preset time may be set as required. This is not limited in the embodiment of the present application.

S1022a. If the MAC entity of the terminal determines that the attribute of the second data packet is the unimportant attribute, when transmission of the second data packet fails, the MAC entity retransmits the second data packet by using the second HARQ parameter.

Specifically, the terminal identifies, based on the data packet carrying the RLC header, whether the attribute of the received data packet is the important attribute or the unimportant attribute. If the attribute is the important attribute, the data packet is transmitted by using the configuration parameter (that is, the first HARQ parameter) corresponding to the important attribute. If the attribute is the unimportant attribute, the data packet is transmitted by using the configuration parameter (that is, the second HARQ parameter) corresponding to the unimportant attribute.

Optionally, on the other hand, operation S102 in the embodiment of the present application may be implemented in the following manner:

S1021b. If the PDCP entity of the terminal determines that the attribute of the first data packet is the important attribute, when a time length of a discard timer corresponding to the first data packet reaches the discard timing length, the PDCP entity discards the first data packet.

Optionally, with reference to FIG. 3, before operation S101 in the embodiment of the present application, the method provided in the embodiment of the present application further includes the following operation:

S110. The terminal processes the to-be-transmitted service to obtain a plurality of data packets having different attributes.

It should be noted that a specific implementation of operation S103 in the embodiment of the present application is similar to that of operation S101. For details, refer to a specific implementation of operation S101. This is not limited in the embodiment of the present application. A specific implementation of operation S104 is similar to that of operation S102. This is not limited in the embodiment of the present application.

Figure 7:
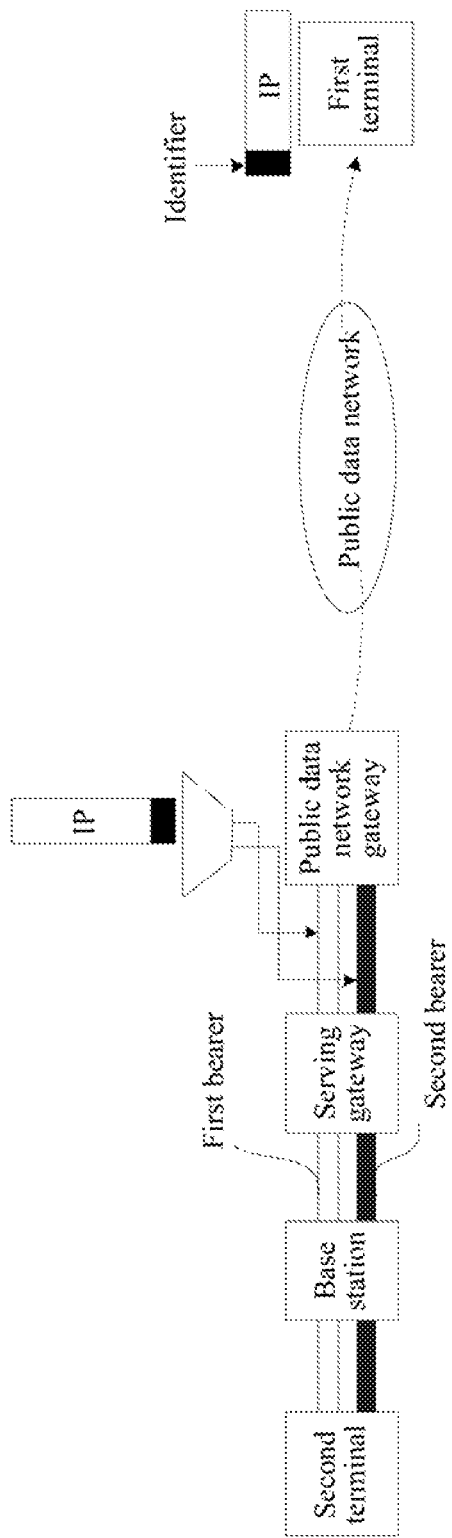
FIG. 7 is a schematic diagram of another transmission architecture according to an embodiment of the present application.
Figure 8:
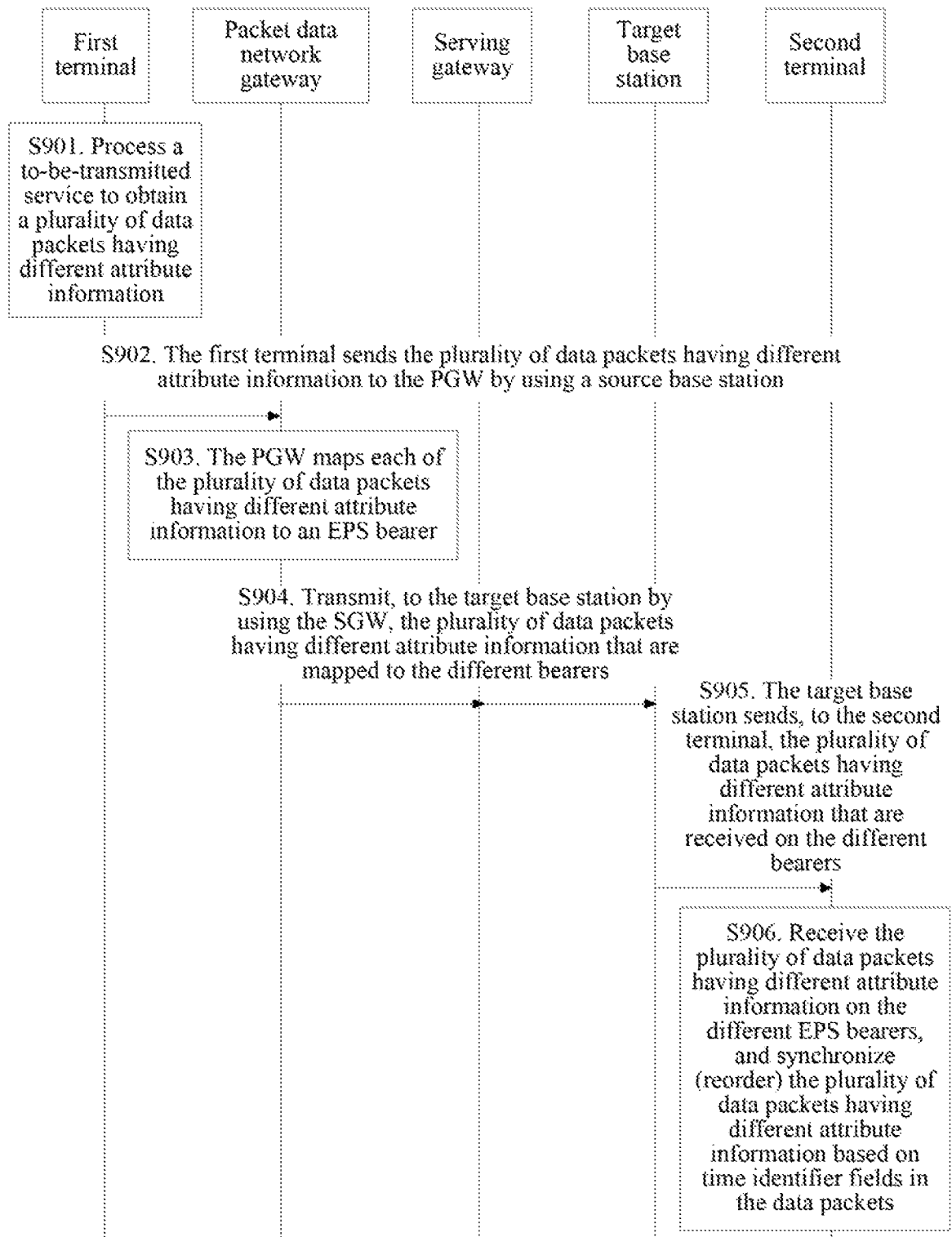
FIG. 8 is a schematic flowchart 5 of a data transmission method according to an embodiment of the present application.

FIG. 7 shows an architectural diagram used by another data transmission method according to an embodiment of the present application. In the architecture shown in FIG. 7, a first terminal sends a plurality of data packets having different attributes to a second terminal by using a source base station. For example, the second terminal may receive, by using a packet data network gateway, a serving gateway, and a target base station, the plurality of data packets having different attributes sent by the source base station. Specifically, as shown in FIG. 8, the data transmission method includes the following operations.

S901. The first terminal processes a to-be-transmitted service to obtain a plurality of data packets having different attributes, where an attribute of a data packet is used to indicate importance of the data packet.

Specifically, the first terminal process the to-be-transmitted service according to the H.264 standard in a coding layer, to obtain a plurality of data packets having different attributes. Then, the plurality of data packets having different attributes are formed as RTP data packets after passing through an RTP layer, and sent to an IP layer. On the IP layer, the terminal adds an IP header to the plurality of data packets having different attributes, and indicates an attribute of each data packet by using one-bit information in the IP header. For example, the terminal may extend a TOS field in the IP header and indicate the attribute of the data packet based on the one-bit information in the TOS field.

S902. The first terminal sends the plurality of data packets having different attributes to a PGW by using a source base station, where the PGW is a gateway accessed by a second terminal.

It may be understood that in an actual transmission process, when the first terminal is relatively close to the second terminal, the gateway accessed by the second terminal and a gateway accessed by the first terminal may be the same, or even base stations accessed by the first terminal and the second terminal may also be the same.

S903. The PGW maps each of the plurality of data packets having different attributes to an EPS bearer, where the data packets having different attributes correspond to different EPSs.

A bearer is a bearer channel for carrying and sending packet data between the second terminal and a core network serving the second terminal during a communication session. Specifically, the bearer may be an EPS bearer.

As shown in FIG. 7, there are two bearers, namely, a first bearer and a second bearer, between the second terminal and the PGW. Specifically, the PGW maps a data packet having an important attribute to the first bearer for transmission and maps a data packet having an unimportant attribute to the second bearer for transmission.

S904. The PGW transmits, to a target base station by using an SGW, the plurality of data packets having different attributes mapped to different bearers.

The target base station is a base station serving the second terminal.

S905. The target base station sends, to the second terminal, the plurality of data packets having different attributes received on the different bearers.

S906. The second terminal receives the plurality of data packets having different attributes on the different EPS bearers, and synchronizes (reorders) the plurality of data packets having different attributes based on time identifiers (timestamp) in the data packets.

The foregoing mainly describes the technical solutions provided in the embodiments of the present application from perspectives of the terminal and the base station. It may be understood that, to implement the foregoing functions, the base station and the terminal include a corresponding hardware structure and/or software module for performing each function. A person skilled in the art should easily be aware that, units and algorithm operations in the examples described with reference to the embodiments disclosed in the specification may be implemented in a form of hardware or a combination of hardware and computer software in the embodiments of the present application. Whether a function is implemented by hardware or in a manner of driving hardware by a computer software depends on a particular application and a design constraint condition of the technical solution. One of ordinary skill in the art may use different methods to implement the described functions for each particular application, but it should not be considered that the implementation goes beyond the scope of the present application.

In the embodiments of the present application, the terminal, the base station and the like may be divided into function modules based on the foregoing method examples. For example, each function module may be obtained through division for a corresponding function, or two or more functions may be integrated into one processing module. The integrated module may be implemented in a form of hardware, or may be implemented in a form of a functional module of software. It should be noted that, the module division in the embodiments of the present application is an example and is only logical function division. There may be another division manner in actual implementation.

Figure 9A:
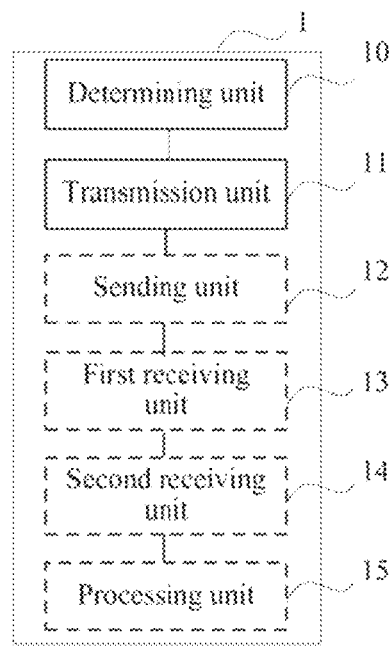
FIG. 9a is another schematic structural diagram of a terminal according to an embodiment of the present application.

When each functional module is divided corresponding to each function, FIG. 9a is a possible schematic structural diagram of the terminal in the foregoing embodiments. The terminal 1 includes a determining unit 10 and a transmission unit 11. The determining unit 10 is configured to support the terminal 1 in performing the processes S101 (which may be operations S1011b, S1011c, and S1012c), S107 (which may be operations S1071a and S1071b), and S108 that are described in the foregoing embodiment. The transmission unit 11 is configured to support the terminal 1 in performing operation S102 (which may be operations S1021a, S1022a, S1021b, and S1022b) described in the foregoing embodiment. Certainly, the terminal 1 provided in the embodiment of the present application may further include: a sending unit 12 configured to support the terminal 1 in performing operation S109 in the foregoing embodiment, a first receiving unit 13 configured to support the terminal 1 in performing operation S1011a in the foregoing embodiment, and a second receiving unit 14 configured to support the terminal 1 in performing operations S106 and S101a in the foregoing embodiment; and the terminal 1 may further include a processing unit 15 configured to support the terminal 1 in performing operation S110 in the foregoing embodiment. All related content of each operation in the foregoing method embodiments may be cited in function descriptions of a corresponding function module. Details are not described herein again.

It may be understood that in terms of hardware implementation, on one hand, the determining unit 10, the transmission unit 11, the sending unit 12, and the first receiving unit 13 may be integrated on a MAC entity of the terminal shown in FIG. 2a, FIG. 2d, FIG. 2e, and FIG. 2f, and on the other hand, the first receiving unit 13 and the second receiving unit 14 may be a receiver, the sending unit 12 may be a transmitter, and the transmitter may be integrated with the receiver into a transceiver. The determining unit 10 and the transmission unit 11 may be embedded into or independent of a memory of the terminal in a form of hardware, so as to be invoked by a processor of the terminal to perform operations corresponding to the various units described above.

Figure 9B:
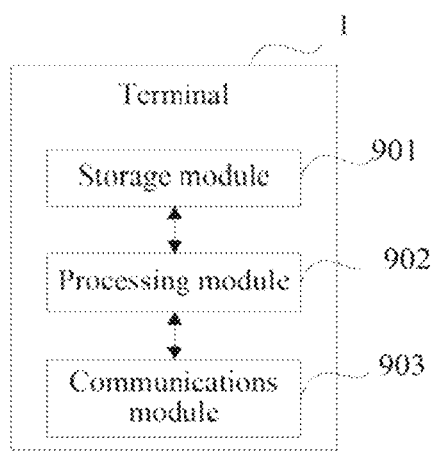
FIG. 9b is still another schematic structural diagram of a terminal according to an embodiment of the present application.

When an integrated unit is used, FIG. 9b is a possible schematic structural diagram of the terminal in the foregoing embodiments. The terminal 1 includes a processing module 902 and a communications module 903. The processing module 102 is configured to control and manage actions of the terminal 1. For example, the processing module 902 is configured to support the terminal 1 in performing operations S101 (which may be operations S1011a, S1011b, S1011c, and S1012c), S101a, S107 (which may be operations S1071a and S1071b), S108, S102 (which may be operations S1021a, S1022a, S1021b, and S1022b), S106, S109, and S110 that are described in the embodiments, and/or another process used for the technologies described in this specification. The communications module 903 is configured to support the terminal 1 in communicating with another network entity, for example, support the terminal 1 in communicating with a base station, and the terminal 1 may further include a storage module 901 configured to store program code and data of the terminal 1.

The processing module 902 may be a processor or a controller, such as a central processing unit (CPU), a general purpose processor, a digital signal processor (DSP), an application-specific integrated circuit (ASIC), a field programmable gate array (FPGA), or another programmable logic device, a transistor logic device, a hardware component, or any combination thereof. The processing module 102 can implement or execute various example logical blocks, modules, and circuits that are described with reference to the content disclosed in the present application. Alternatively, the processor may be a combination for implementing a computing function, for example, a combination of one or more microprocessors or a combination of the DSP and a microprocessor. The communications module 103 may be a transceiver, a transceiver circuit, a communications interface 1013, or the like. The storage module 901 may be a memory.

Figure 9C:
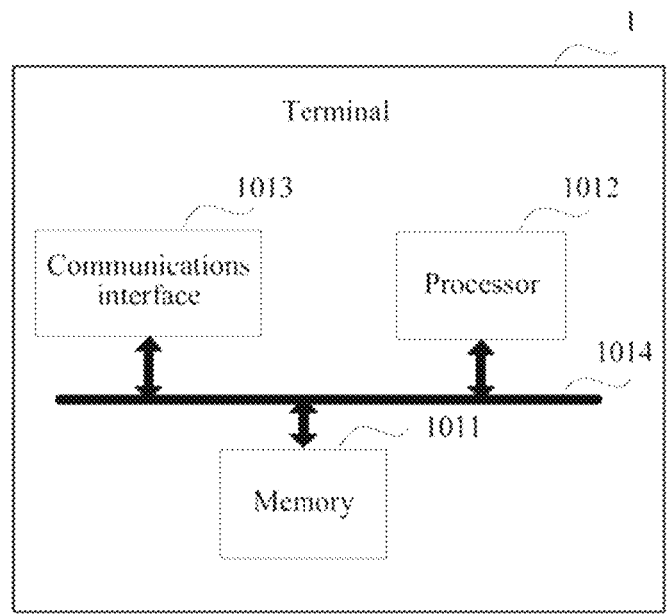
FIG. 9c is yet another schematic structural diagram of a terminal according to an embodiment of the present application.

When the processing module 902 is a processor 1012, the communications module 903 is a communications interface 1013, and the storage module 901 is a memory 1011, the terminal 1 in the embodiment of the present application may be the terminal shown in FIG. 9c.

Referring to FIG. 9c, the terminal 1 includes: a processor 1012, a communications interface 1013, a memory 1011, and a bus 1014. The communications interface 1013, the processor 1012, and the memory 1011 are interconnected by using the bus 1014. The bus 1014 may be a peripheral component interconnect (PCI) bus, an extended industry standard architecture (EISA) bus, or the like. The bus may be classified into an address bus, a data bus, a control bus, or the like. For ease of representation, the bus is represented by using only one thick line in FIG. 9c for representation, but it does not indicate that there is only one bus or one type of bus.

Figure 10A:
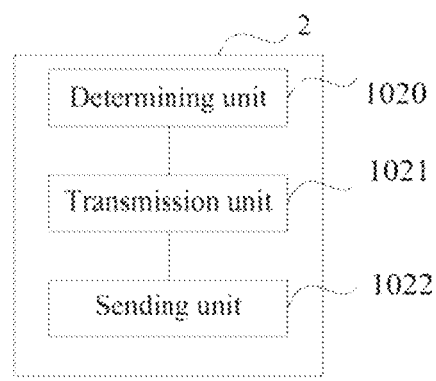
FIG. 10a is another schematic structural diagram of a terminal according to an embodiment of the present application.

When each functional module is divided corresponding to each function, FIG. 10a is a possible schematic structural diagram of the base station in the foregoing embodiments. The base station 2 includes a determining unit 1020 and a transmission unit 1021. The determining unit 1020 is configured to support the base station 2 in performing the process S103 described in the foregoing embodiment. The transmission unit 1021 is configured to support the base station 2 in performing operation S104 described in the foregoing embodiment. Certainly, the base station 2 provided in the embodiment of the present application may further include a sending unit 1022 configured to support the base station 2 in performing operation S105 in the foregoing embodiment. All related content of each operation in the foregoing method embodiments may be cited in function descriptions of a corresponding function module. Details are not described herein again.

It may be understood that in terms of hardware implementation, on one hand, the determining unit 1020, the transmission unit 1021, and the sending unit 1022 may be integrated on a MAC entity of the base station; and on the other hand, the determining unit 1020 and the transmission unit 1021 may be embedded into or independent of a memory of the base station in a form of hardware, so as to be invoked by a processor of the base station to perform operations corresponding to the various units described above.

Figure 10B:
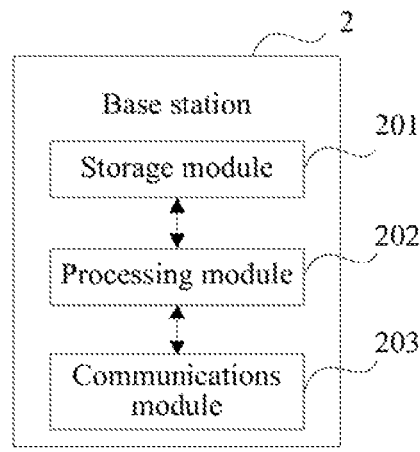
FIG. 10b is still another schematic structural diagram of a terminal according to an embodiment of the present application.

When an integrated unit is used, FIG. 10b is a possible schematic structural diagram of the base station related in the foregoing embodiment. The base station 2 includes a processing module 202 and a communications module 203. The processing module 202 is configured to control and manage actions of the base station 2. For example, the processing module 202 is configured to support the base station 2 in performing operations S103, S104, and S105 described in the embodiments, and/or another process used for the technologies described in this specification. The communications module 203 is configured to support the base station 2 in communicating with another network entity, for example, support the base station 2 in communicating with a terminal, and the base station 2 may further include a storage module 201 configured to store program code and data of the base station 2.

The processing module 202 may be a processor or a controller, such as a central processing unit (CPU), a general purpose processor, a digital signal processor (DSP), an application-specific integrated circuit (ASIC), a field programmable gate array (FPGA), or another programmable logic device, a transistor logic device, a hardware component, or any combination thereof. The processing module 202 can implement or execute various example logical blocks, modules, and circuits that are described with reference to the content disclosed in the present application. Alternatively, the processor may be a combination for implementing a computing function, for example, a combination of one or more microprocessors or a combination of the DSP and a microprocessor. The communications module 203 may be a transceiver, a transceiver circuit, a communications interface 2013, or the like. The storage module 201 may be a memory.

Figure 10C:
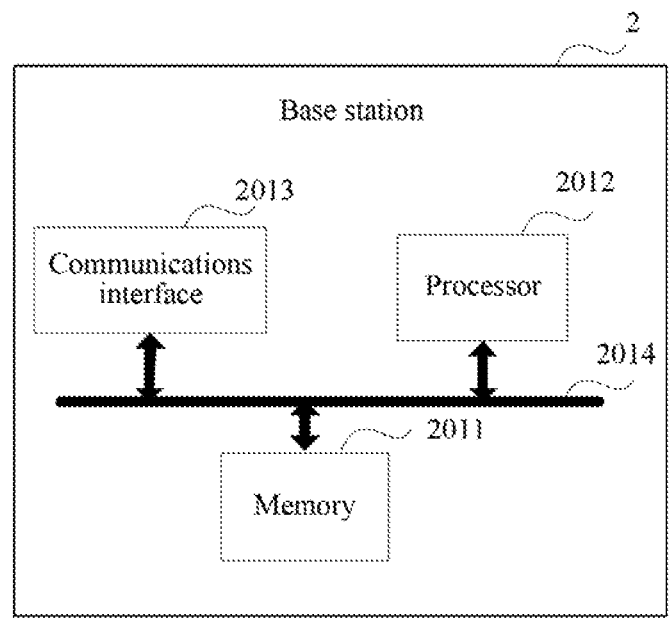
FIG. 10c is yet another schematic structural diagram of a terminal according to an embodiment of the present application.

When the processing module 202 is a processor 2012, the communications module 203 is a communications interface 2013, and the storage module 201 is a memory, the base station 2 in the embodiment of the present application may be the base station shown in FIG. 10c.

Referring to FIG. 10c, the base station 2 includes: a processor 2012, a communications interface 2013, a memory 2011, and a bus 2014. The communications interface 2013, the processor 2012, and the memory 2011 are interconnected by using the bus 2014. The bus 2014 may be a peripheral component interconnect (PCI) bus, an extended industry standard architecture (EISA) bus, or the like. The bus may be classified into an address bus, a data bus, a control bus, or the like. For ease of representation, the bus is represented by using only one thick line in FIG. 10c, but it does not indicate that there is only one bus or one type of bus.

On one hand, an embodiment of the present application provides a computer-readable storage medium, the computer-readable storage medium stores an instruction, and when the computer-readable storage medium is run on a computer, a base station is enabled to perform operations S103, S104, and S105 in the foregoing embodiments.

On the other hand, an embodiment of the present application provides a computer-readable storage medium, the computer-readable storage medium stores an instruction, and when the computer-readable storage medium is run on a computer, a terminal is enabled to perform operation S101 (S1011a, S1011b, S1011c, and S1012c), S102 (which may be operations S1021a, S1022a, S1021b, and S1022b), S106, S107 (which may be operations S1071a and S1071b), S108 (S1081a, S1082a, and S1081b), S109, and S110 in the foregoing embodiments.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedures or functions according to the embodiments of the present application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave and the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD), or the like.

The foregoing descriptions about implementations allow one of ordinary skill in the art to clearly understand that, for the purpose of convenient and brief description, division of the foregoing function modules is used as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is only an example. For example, the module or unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, a network device, or the like) or a processor to perform all or some of the operations of the methods described in the embodiments of this application. The foregoing storage medium includes: any medium that can store program code, such as a flash memory, a removable hard disk, a read-only memory, a random access memory, a magnetic disk, or a compact disc.

The foregoing descriptions are merely specific embodiments of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A data transmission method, comprising:
   determining, by a communications device, an attribute of a data packet to be transmitted, wherein the attribute of the data packet is used to indicate importance of the data packet;
   determining, by the communications device, a configuration parameter of the data packet based on the attribute of the data packet, wherein the configuration parameter is one of a hybrid automatic repeat request (HARQ) parameter or a discard timing length; and
   transmitting, by the communications device, the data packet by using the configuration parameter corresponding to the attribute of the data packet, wherein the attribute is an important attribute or an unimportant attribute, the configuration parameter is the hybrid automatic repeat request (HARQ) parameter, and the determining, by the communications device, the configuration parameter of the data packet based on the attribute of the data packet comprises:
   determining, by the communications device, that the configuration parameter of the data packet is a first HARQ parameter or a second HARQ parameter, wherein the first HARQ parameter is the configuration parameter corresponding to the important attribute, the second HARQ parameter is the configuration parameter corresponding to the unimportant attribute, and a value of the first HARQ parameter is greater than the value of the second HARQ parameter; or
   the configuration parameter is the discard timing length, and the determining, by the communications device, the configuration parameter of the data packet based on the attribute of the data packet comprises:
   determining, by the communications device, that the configuration parameter of the data packet is a first discard timing length or a second discard timing length, wherein the first discard timing length is the configuration parameter corresponding to the important attribute, the second discard timing length is the configuration parameter corresponding to the unimportant attribute, and the first discard timing length is greater than the second discard timing length.

2. The method according to claim 1, wherein the determining, by the communications device, the attribute of the data packet to be transmitted comprises:
   receiving, by the communications device by using a media access control (MAC) entity, first indication information sent by a packet data convergence protocol (PDCP) entity of the communications device, wherein the first indication information is used to indicate the attribute of the data packet received by the communications device; and
   determining, by the communications device, the attribute of the data packet according to the first indication information; or
   determining, by the communications device, the attribute of the data packet based on a radio link control (RLC) header of the data packet, wherein the RLC header carries an identifier that uniquely identifies the attribute of the data packet.

3. The method according to claim 1, wherein the determining the attribute of the data packet to be transmitted comprises:

determining, by the communications device, the attribute of the data packet obtained through a first logical channel as an important attribute; and determining, by the communications device, the attribute of the data packet obtained through a second logical channel as an unimportant attribute.

4. The method according to claim 3, wherein the communications device is a terminal, and before the determining the attribute of the data packet to be transmitted, the method further comprises:

receiving, by the terminal, second indication information sent by a base station, wherein the second indication information is used to indicate a correspondence between data packets having different attributes and logical channels used for transmitting the data packets.

5. The method according to claim 1, wherein the communications device is a terminal, and before the determining, by the communications device, the configuration parameter of the data packet based on the attribute of the data packet, the method further comprises:

receiving, by the terminal, first configuration instruction information sent by a base station, wherein the first configuration instruction information is used to instruct the terminal to configure different configuration parameters for data packets having different attributes.

6. The method according to claim 1, wherein the communications device is a base station, and the method further comprises:

sending, by the base station, first configuration instruction information to a terminal, wherein the first configuration instruction information is used to instruct the terminal to configure different configuration parameters for data packets having different attributes.

7. A communications device, comprising:

a processor and a memory coupled to the processor; wherein the processor is configured to:

determine an attribute of a data packet to be transmitted, wherein the attribute of the data packet is used to indicate importance of the data packet;

determine a configuration parameter of the data packet based on the attribute of the data packet, wherein the configuration parameter is a hybrid automatic repeat request (HARQ) parameter or a discard timing length; and transmit the data packet by using the configuration parameter corresponding to the attribute of the data packet, wherein the attribute is an important attribute or an unimportant attribute, the configuration parameter is the hybrid automatic repeat request (HARQ) parameter, and the processor is configured to determine that the configuration parameter of the data packet is a first HARQ parameter or a second HARQ parameter, wherein the first HARQ parameter is the configuration parameter corresponding to the important attribute, the second HARQ parameter is the configuration parameter corresponding to the unimportant attribute, and a value of the first HARQ parameter is greater than the value of the second HARQ parameter; or the configuration parameter is the discard timing length, and the processor is further configured to determine that the configuration parameter of the data packet is a first discard timing length or a second discard timing length, wherein the first discard timing length is the configuration parameter corresponding to the important attribute, the second discard timing length is the configuration parameter corresponding to the unimportant attribute, and the first discard timing length is greater than the second discard timing length.

8. The communications device according to claim 7, wherein the processor is configured to:

receive, by using a media access control (MAC) entity of the communications device, first indication information sent by a packet data convergence protocol (PDCP) entity of the communications device to the MAC entity, wherein the first indication information is used to indicate the attribute of the data packet; and determine the attribute of the data packet according to the first indication information; or determine the attribute of the data packet based on a radio link control (RLC) header of the data packet, wherein the RLC header carries an identifier that uniquely identifies the attribute of the data packet.

9. The communications device according to claim 7, wherein the processor is configured to: determine the attribute of the data packet obtained through a first logical channel as an important attribute; and determine the attribute of the data packet obtained through a second logical channel as an unimportant attribute.

10. The communications device according to claim 9, wherein the processor is configured to receive second indication information sent by a base station, wherein the second indication information is used to indicate a correspondence between data packets having different attributes and logical channels used for transmitting the data packets.

11. The communications device according to claim 7, wherein the processor is configured to, configured to receive first configuration instruction information sent by a base station, wherein the first configuration instruction information is used to instruct a terminal to configure different configuration parameters for data packets having different attributes.

12. The communications device according to claim 7, wherein the communications device is a base station, and the processor is configured to send first configuration instruction information to a terminal, wherein the first configuration instruction information is used to instruct the terminal to configure different configuration parameters for data packets having different attributes.

13. A non-transitory computer readable medium comprising instructions stored therein that, when executed by a processor, the instructions cause the processor to perform a method, the method comprising:

determining an attribute of a data packet to be transmitted, wherein the attribute of the data packet is used to indicate importance of the data packet;

determining a configuration parameter of the data packet based on the attribute of the data packet, wherein the configuration parameter is one of a hybrid automatic repeat request (HARQ) parameter or a discard timing length; and transmitting the data packet by using the configuration parameter corresponding to the attribute of the data packet, wherein the attribute is an important attribute or an unimportant attribute, the configuration parameter is the hybrid automatic repeat request (HARQ) parameter, and the determining the configuration parameter of the data packet based on the attribute of the data packet comprises:

determining that the configuration parameter of the data packet is a first HARQ parameter or a second HARQ parameter, wherein the first HARQ parameter is the configuration parameter corresponding to the important attribute, the second HARQ parameter is the configuration parameter corresponding to the unimportant attribute, and a value of the first HARQ parameter is greater than the value of the second HARQ parameter; or the configuration parameter is the discard timing length, and the determining the configuration parameter of the data packet based on the attribute of the data packet comprises:

determining that the configuration parameter of the data packet is a first discard timing length or a second discard timing length, wherein the first discard timing length is the configuration parameter corresponding to the important attribute, the second discard timing length is the configuration parameter corresponding to the unimportant attribute, and the first discard timing length is greater than the second discard timing length.

14. The medium according to claim 13, wherein the determining the attribute of the data packet to be transmitted comprises:

receiving by using a media access control (MAC) entity, first indication information sent by a packet data convergence protocol (PDCP) entity of a communications device, wherein the first indication information is used to indicate the attribute of the data packet received by the communications device; and determining the attribute of the data packet according to the first indication information; or determining the attribute of the data packet based on a radio link control (RLC) header of the data packet, wherein the RLC header carries an identifier that uniquely identifies the attribute of the data packet.

15. The medium according to claim 13, wherein the determining the attribute of the data packet to be transmitted comprises:

determining the attribute of the data packet obtained through a first logical channel as an important attribute; and determining the attribute of the data packet obtained through a second logical channel as an unimportant attribute.

16. The medium according to claim 15, wherein before the determining the attribute of the data packet to be transmitted, the method further comprises:

receiving second indication information sent by a base station, wherein the second indication information is used to indicate a correspondence between data packets having different attributes and logical channels used for transmitting the data packets.

17. The medium according to claim 13, wherein before the determining the configuration parameter of the data packet based on the attribute of the data packet, the method further comprises:

receiving first configuration instruction information sent by a base station, wherein the first configuration instruction information is used to instruct to configure different configuration parameters for data packets having different attributes.

\* \* \* \* \*